US009428330B2

(12) United States Patent  (10) Patent No.: US 9,428,330 B2
Lopez  (45) Date of Patent: Aug. 30, 2016

(54) INTERLOCKING CONTAINER

(71) Applicant: Double Crown Resources Inc., Henderson, NV (US)

(72) Inventor: Allen E. Lopez, Houston, TX (US)

(73) Assignee: DOUBLE CROWN RESOURCES INC., Henderson, NV (US)

( * ) Notice: Subject to any disclaimer, the term of this patent is extended or adjusted under 35 U.S.C. 154(b) by 27 days.

(21) Appl. No.: 14/561,028

(22) Filed: Dec. 4, 2014

(65) Prior Publication Data

US 2015/0291348 A1     Oct. 15, 2015

Related U.S. Application Data

(60) Provisional application No. 62/072,022, filed on Oct. 29, 2014, provisional application No. 61/978,628, filed on Apr. 11, 2014.

(51) Int. Cl.
| | |
|---|---|
| *B65D 88/32* | (2006.01) |
| *B65D 88/02* | (2006.01) |
| *B65D 88/30* | (2006.01) |
| *B65D 88/54* | (2006.01) |
| *B65D 90/58* | (2006.01) |
| *B65D 90/66* | (2006.01) |
| *B65G 53/06* | (2006.01) |
| *B65G 53/36* | (2006.01) |

(52) U.S. Cl.
CPC .............. *B65D 88/32* (2013.01); *B65D 88/027* (2013.01); *B65D 88/30* (2013.01); *B65D 88/548* (2013.01); *B65D 90/587* (2013.01); *B65D 90/66* (2013.01); *B65D 2590/0091* (2013.01); *B65G 53/06* (2013.01); *B65G 53/36* (2013.01)

(58) Field of Classification Search
CPC .... B65D 88/32; B65D 88/027; B67D 7/0294; B67D 3/0038
See application file for complete search history.

(56) References Cited

U.S. PATENT DOCUMENTS

| 333,105 A | 12/1885 | Bremaker et al. |
|---|---|---|
| 2,492,585 A | 12/1949 | Kohout |
| 2,624,479 A | 1/1953 | Musschoot et al. |
| 3,645,583 A | 2/1972 | Heath |

(Continued)

FOREIGN PATENT DOCUMENTS

| CA | 2560109 A1 | 3/2008 |
|---|---|---|
| CA | 2600216 C | 3/2009 |

(Continued)

OTHER PUBLICATIONS

International Search Report and Written Opinion issued in PCT/US2015/025517 mailed Jul. 6, 2015.

(Continued)

*Primary Examiner* — Jonathan Snelting
(74) *Attorney, Agent, or Firm* — Faegre Baker Daniels LLP

(57) ABSTRACT

An interlocking container for intermodal transportation includes a plurality of storage chambers that are surrounded by a frame. The frame is configured to support multiple interlocking containers stacked on top of the interlocking container. Each of the storage chambers are configured to couple with a vertically adjacent storage chamber, so that materials stored within a particular storage chamber may travel to a different storage chamber. Each storage chamber uses a sealing member to couple with a vertically adjacent storage chamber to prevent loss of materials.

18 Claims, 51 Drawing Sheets

(56) References Cited

U.S. PATENT DOCUMENTS

| | | |
|---|---|---|
| 3,854,612 A | 12/1974 | Snape |
| 4,100,872 A | 7/1978 | Matsuno et al. |
| 4,389,150 A | 6/1983 | Stenlund |
| 4,526,121 A | 7/1985 | Shudo et al. |
| 4,844,672 A | 7/1989 | Yurgevich |
| 4,848,619 A | 7/1989 | Corompt |
| 4,966,311 A | 10/1990 | Taylor |
| 5,072,845 A | 12/1991 | Grogan |
| 5,265,748 A | 11/1993 | Furukawa |
| 5,303,998 A | 4/1994 | Whitlatch et al. |
| 5,350,257 A | 9/1994 | Newbolt et al. |
| 5,353,967 A | 10/1994 | Toth et al. |
| 5,775,852 A | 7/1998 | Boutte et al. |
| 5,816,423 A | 10/1998 | Fenton et al. |
| 7,101,120 B2 | 9/2006 | Jurkovich |
| 7,278,811 B1 | 10/2007 | Yielding et al. |
| 7,591,386 B2 | 9/2009 | Hooper |
| 8,087,816 B2 | 1/2012 | Sisk |
| 8,827,118 B2 * | 9/2014 | Oren ............... B65D 88/32 206/221 |
| 8,915,691 B2 | 12/2014 | Mintz |
| 8,985,400 B2 | 3/2015 | Swan et al. |
| 9,051,801 B1 | 6/2015 | Mintz |
| 2003/0206776 A1 | 11/2003 | Pearson |
| 2006/0118504 A1 | 6/2006 | Willemsen |
| 2006/0180232 A1 | 8/2006 | Glewwe et al. |
| 2008/0226434 A1 | 9/2008 | Smith et al. |
| 2010/0025407 A1 * | 2/2010 | Benson ............... B65D 88/022 220/564 |
| 2010/0186444 A1 | 7/2010 | Evers et al. |
| 2011/0204094 A1 | 8/2011 | Meckstroth et al. |
| 2013/0001224 A1 | 1/2013 | Payne |
| 2013/0004272 A1 | 1/2013 | Mintz |
| 2013/0206415 A1 | 8/2013 | Sheesley |
| 2013/0259614 A1 | 10/2013 | Vasilescu et al. |
| 2014/0023465 A1 | 1/2014 | Oren et al. |
| 2014/0286716 A1 | 9/2014 | Cochrum et al. |
| 2015/0239384 A1 | 8/2015 | Meier |
| 2015/0284180 A1 | 10/2015 | Glowacki et al. |
| 2015/0284194 A1 | 10/2015 | Oren et al. |
| 2015/0368039 A1 | 12/2015 | Cochrum et al. |

FOREIGN PATENT DOCUMENTS

| | | |
|---|---|---|
| WO | 9521782 A1 | 8/1995 |
| WO | 2014153553 A2 | 9/2014 |

OTHER PUBLICATIONS

International Application No. PCT/US2015/025517. Notification of Transmittal of the International Search Report and the Written Opinion of the International Searching Authority, or the Declaration. International Filing Date: Apr. 13, 2015. Mail Date: Jul. 6, 2015. 11 pages.
Cochrum et al. U.S. Appl. No. 61/804,502, filed May 5, 2013.
Cochrum et al. U.S. Appl. No. 14/142,211, filed Dec. 27, 2013.
Allen E. Lopez. U.S. Appl. No. 14/561,028, filed Dec. 4, 2014.
400 Barrel Vertical Storage Tanks. <http://www.apexoil.ca/products-solutions/tanks/400bbl-vertical-storage-tanks>. 2 Pages. Accessed Apr. 10, 2014.
Advantage Series "1033" Pneumatic Dry Bulk Trailer. Trail King Industries. 3 pages. Believed to have been publicly available prior to Apr. 11, 2013.
Apex. Oilfield Tank Farms. <http://www.apexoil.ca/products-solutions/tanks/tank-farms>. 2 pages. Accessed Apr. 10, 2013.
Applications. Synergy Natural Resources, LLC. Portable Aggregate Supply System. 1 page. Accessed Apr. 24, 2013.
Bulk Equipment Experts! Heil 1040CF Pneumatic Trailer—Cementer / Sander. 4 pages. Accessed May 10, 2013.
Bulk Storage and Transport. Aker Solutions. 1 page. Accessed Apr. 10, 2013.
Bulk Storage Tank. Aker Solutions. 1 page. Accessed Apr. 10, 2013.
Bulk Surge Tank. Aker Solutions. 1 page. Accessed Apr. 10, 2013.
Cochrum et al. U.S. Appl. No. 61/804,502, filed Mar. 22, 2013.
Dust Cyclone and Collector. Aker Solutions. 1 page. Accessed Apr. 10, 2013.
N-Motion Freight. Frac Sand Transport—Frac Sand Hauling—Fracking Services. <http://www.nmotionfreight.com/services/frac-sand-transport/>. 2 pages. Accessed May 10, 2013.
PASSBOX Portable-Aggregate-Supply-System. 1 page. Accessed Feb. 27, 2015.
PneuMACtic Tank Trailers. MAC Trailer. 3 pages. Believed to have been publicly available prior to Apr. 11, 2013.
PneuMACtic Trailers. MAC Trailer. 8 pages. Believed to have been publicly available prior to Apr. 11, 2013.
Pneumatic Trailer. Dry Bulk. Polar. 2 pages. Believed to have been publicly available prior to Apr. 11, 2013.
Premix Tanks. Apex. <http://www.apexoil.ca/products-solutions/tanks/premix-tanks>. 2 pages. Accessed May 10, 2013.
Pro Sands LLC. Frac Sand Haulers—Frac Sand Transport—Pro Sands LLC. 1 page. Accessed May 10, 2013.
Rawson, Jeffrey A. Aggregate Transportation by Rail: Changing Ideologies in a Declining Economy. 21 pages. Believed to have been publicly available prior to Apr. 11, 2013.
Series "1033" Pneumatic Dry Bulk Trailer. Trail King Industries. 4 pages. Believed to have been publicly available prior to Apr. 11, 2013.
SNR to Launch Portable Aggregate Supply System. Synergy Natural Resources, LLC. 1 page. Accessed Apr. 24, 2013.
The PASS Box (Portable Aggregate Supply Systems). Synergy Natural Resources, LLC. 1 page. Accessed Apr. 10, 2013.
Portare Services LLC. FRACBOX. <http://portareservices.com/products-fracbox/>. 2 pages. Mar. 26, 2014.
Passbox Global. A new way to move bulk materials . . . <http://passboxglobal.com/> May 5, 2014.

* cited by examiner

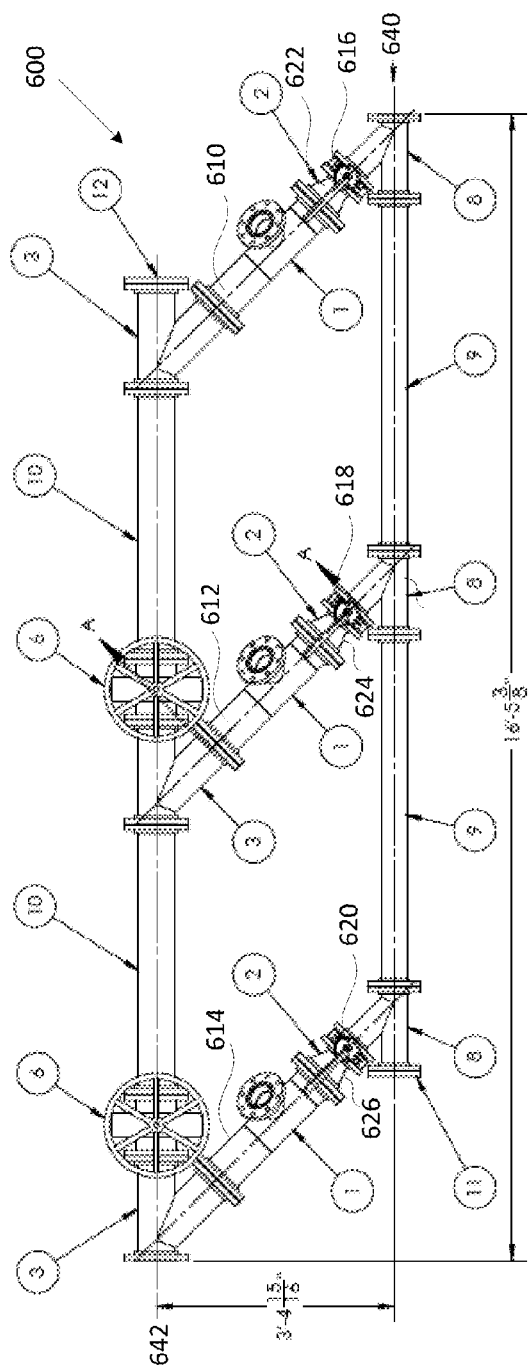
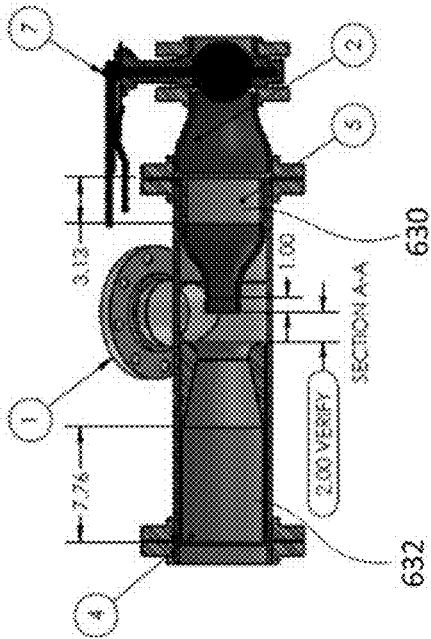
FIG. 28
FIG. 29

Governing code or standard: ASME Unfired BPV Code Section VIII, Division 1
Assumptions:

Design parameters:

Contents: sand at 100 pounds per cubic foot.

$\gamma_{sand} := 100 \frac{lbf}{ft^3}$ ...Specific weight of sand.

$Vol. := 64.7\, ft^3$ ...Internal container volumetric capacity $C_{fl} := 18\,in$ ...Floor clearance.

$P := 90\,psig$ ...Internal pressure $P_H := 30\,psig$ ...Minimum internal design pressure per ASME PV Code.

$C_a := 0.063\,in$ ...Internal corrosion/erosion allowance.

$\lambda := 0.44$ ...Optimal height to diameter ratio.

$\theta := 34\,deg$ ...Angle of repose for sand.

$d := 4.026\,in$ ...Inside diameter of bottom outlet $\mu := 0.6$ ...Static coefficient of friction sand to steel.

FIG. 49

Calculations:

$W_{cont} = Vol \cdot \gamma_{sand}$   $W_{cont} = 6470\, lbf$   ...Weight of contents full container.

$\alpha = 2 \cdot \theta$   $\alpha = 68\, deg$   ...Maximum included angle of bottom cone $\beta = \alpha - 8\, deg$   $\beta = 60\, deg$   ...Included angle of bottom cone used.

$Vol = 0.25 \cdot \pi \cdot D^2 \cdot H + 0.2618 \cdot h \cdot (D^2 + D \cdot d + d^2)$   ...Governing equation for volume disregarding volume of top head.

Given

Guess values:

$D = 36\, in$   $H = 0.5 \cdot D$   $h = 0.5 \cdot D$

Constraints:

$$D = \frac{\frac{\sqrt{1.0472 \cdot Vol \cdot h - 0.822 \cdot H \cdot d^2 \cdot h - 0.206 \cdot d^2 \cdot h^2 + \pi \cdot H \cdot Vol}}{2} - 0.1309 \cdot d \cdot h}{0.25 \cdot \pi \cdot H + 0.2618 \cdot h}$$

$H = \lambda \cdot D$ $h = \dfrac{0.5 \cdot (D - d)}{\tan\left(\dfrac{\beta}{2}\right)}$ $\begin{pmatrix} D \\ H \\ h \end{pmatrix} = Find(D, H, h)$   ...Numerical solution of two simultaneous equations.

Solution results for circular cross-section shell:

$D = 38.027\, in$   ...Inside diameter of cylinderical shell $H = 25.532\, in$   ...Height of cylinderical shell $h = 46.766\, in$   ...Height of conical bottom.

FIG. 50

Check:

$$Vol_{new} = 0.25 \cdot \pi \cdot D^2 \cdot H + 0.2618 \cdot h \cdot (D^2 + D \cdot d + d^2) \qquad Vol = 64.7 \cdot ft^3 \quad OK!$$

Side length of equivalent square cross-section bin:

$$L_{side} := \sqrt{0.25 \cdot \pi \cdot D^2} \qquad L_{side} = 51.425 \cdot in$$

Pressure due to granular fill:

$$\phi := atan(\mu) \qquad \phi = 30.964 \cdot deg \qquad \text{...Friction angle}$$

$$k := \frac{1 - \sin(\phi)}{1 + \sin(\phi)} \qquad k = 0.321 \qquad \text{...Janssen's parameter}$$

$$C_d := 2.0 \qquad \text{...Over pressure correction coefficient}$$

$$P_z := C_d \left[ \frac{\gamma_{sand} \cdot D}{2 \cdot k \cdot \mu} \right] \left[ 1 - e^{\left(\frac{4 \cdot k \cdot \mu}{D} \cdot h\right)} \right] \qquad \text{...Vertical pressure}$$

$$P_z = 8.067 \cdot psi$$

$$P_x := k \cdot P_z \qquad P_x = 2.586 \, psi \qquad \text{...Horizontal pressure}$$

FIG. 51

Pressure vessel shell design:

$P_x := if(P \geq P_h, P, P_h)$    $P = 90 \text{ psi}$    ...Design pressure $P_d := P + P_x$    $P_d = 92.586 \text{ psi}$ $S_a := 20000 \text{ psi}$    ...Maximum allowable tensile stress for A516-70 steel $S_y := 38000 \text{ psi}$    ...2% offset yield strength for A516-70 steel.

Square shell configuration:

$M_c := \dfrac{\left(P_d \cdot L_{side}^{\ 3}\right)}{12}$    $M_c = 1049255 \text{ in·lbf}$    ...Corner bending moment $M_a := \dfrac{P_d \cdot L_{side}^{\ 3}}{24}$    $M_a = 524627 \text{ in·lbf}$    ...Mid span bending moment $t_1 := \sqrt{\dfrac{6 \cdot M_a}{L_{side} \cdot S_a}} + C_a$    $t_1 = 1.812 \text{ in}$    ...Minimum shell wall thickness mid-span $S_{a1} := 2 S_y$    $S_{a1} = 76000 \text{ psi}$    ...Maximum allowable corner bending stress is 2 × yield strength of plate.

FIG. 52

$$t_2 := \sqrt{\frac{6 M_c}{L_{side} \cdot S_{a1}}} + C_a \qquad t_2 = 1.332 \cdot in \qquad \text{...Minimum shell thickness at corner.}$$

$$t1_{min} := if(t_1 \geq t_2, t_1, t_2) \qquad t1_{min} = 1.812 \cdot in \qquad \text{...Minimum shell wall thickness}$$

$$t_1 = 1.125 \cdot in \qquad \text{...Wall thickness used.}$$

Circular shell configuration:

$$e_j := 70\% \qquad \text{...Joint efficiency for no NDT}$$

$$t_{min} := \frac{P_d (0.5 \cdot D)}{S_a e_j - 0.6 P_d} + C_a \qquad t_{min} = 0.256 \cdot in \qquad \text{...Minimum wall thickness for circular shell}$$

$$t_{sh} := \frac{5}{16} \cdot in \qquad \text{...Minimum shell thickness required per ASME PV code.}$$

FIG. 53

Conclusion:

The circular shell design requires less material and less welding and consequently is the configuration preferred.

Head design

$r = 0.70 \, D$  $\quad r = 40.619 \, \text{in}$  ...Radius of dished head (use 40-inch).

$D := 40 \, \text{in}$ $t_h := \dfrac{P_h \cdot r}{2 \cdot S_a \cdot \varepsilon_j - 2 \cdot P_h} + C_a$  $\quad t_h = 0.106 \, \text{in}$  ...Calculated dished head thickness $t_{hd} := \dfrac{3}{16} \, \text{in}$  ...Minimum head thickness per ASME PV Code.

Conical hopper design:

$t_{cone} := \dfrac{P_d \cdot D}{2 \cdot \cos(0.59) \cdot (S_a \cdot \varepsilon_j - 0.6 \cdot P_d)} + C_a$  ...Minimum wall thickness for conical hopper.

$t_{cone} = 0.285 \, \text{in}$ $t_{cone} := \dfrac{3}{16} \, \text{in}$  ...Minimum wall thickness for cone per ASME PV Code (use 1/4" min. for rolling process).

FIG. 54

INTERLOCKING CONTAINER

RELATED APPLICATIONS

This application claims the benefit of U.S. Provisional Patent Application No. 61/978,628, filed on Apr. 11, 2014, and to U.S. Provisional Patent Application No. 62/072,022, filed on Oct. 29, 2014. The contents of both applications are incorporated herein by reference in their entireties for all purposes.

TECHNICAL FIELD

Embodiments of the present invention generally relate to transportation systems, and in particular, to systems and methods for intermodal transportation.

BACKGROUND

Intermodal transportation refers to the transportation of materials using multiple modes of transportation, such as rail, truck, barge, and the like. Changing transportation modes often involves moving materials from one shipping container to another, which increases delays as well as adds costs related to, e.g., the loss of spilled materials. Storing shipping containers can also be costly, as real estate surrounding shipping junctions becomes increasingly valuable.

SUMMARY

According to some embodiments, an interlocking container includes three storage chambers encompassed by a frame. Each storage chamber has an inlet in an upper surface of the storage chamber and an outlet in a lower surface of the storage chamber. Each outlet is coupled to a sealing member. The sealing members transition from a retracted position within the frame to an extended position below the frame in order to operatively couple their associated storage chambers with vertically adjacent storage chambers of a vertically adjacent interlocking container. The interlocking containers are operatively coupled to a conveyance unit, which include multiple transport mechanisms for moving materials from the storage chambers to the target destination.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 28 is a top plan view of a conveyance system, according to embodiments of the present invention.

FIG. 29 is a cut-away view of the conveyance system of FIG. 28 along the lines "A-A" in FIG. 28.

FIG. 49 illustrates an exemplary specification sheet containing design parameters according to some embodiments of the present invention.

FIG. 50 illustrates an exemplary calculation sheet containing calculations for some embodiments of the present invention.

FIG. 51 illustrates an exemplary calculation sheet continuing the calculation sheet of FIG. 50 as well as an exemplary specification sheet containing design parameters relating to pressure due to granular fill, according to embodiments of the present invention.

FIG. 52 illustrates an exemplary specification sheet containing design parameters relating to pressure vessel shell design, according to embodiments of the present invention.

FIG. 53 illustrates an exemplary specification sheet continuing the specification sheet of FIG. 52.

FIG. 54 illustrates an exemplary specification sheet detailing conclusions derived from the sheets shown in FIGS. 49-53.

Figure 1:
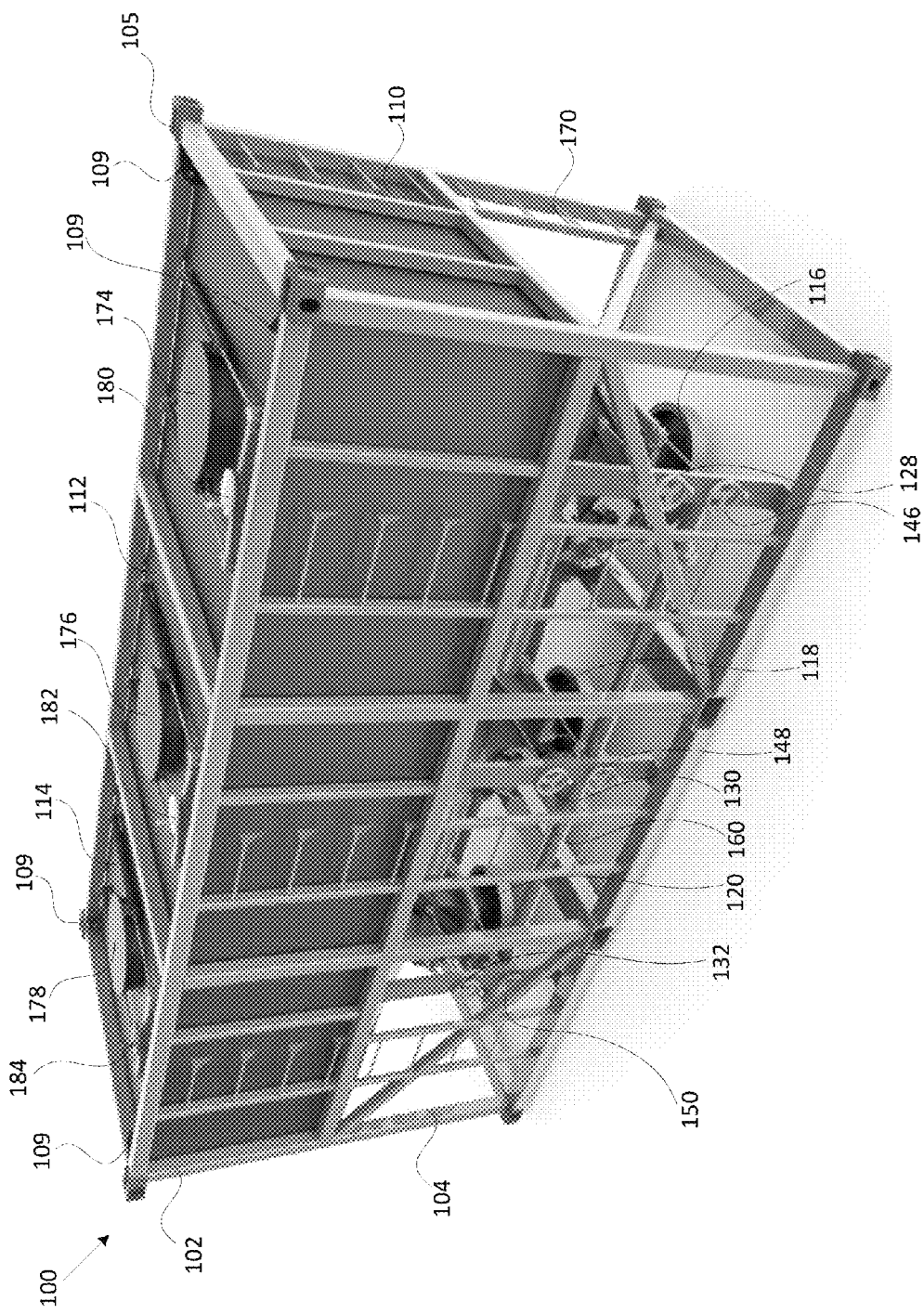
FIG. 1 is an upper perspective view of an interlocking container, according to embodiments of the present invention.
Figure 2:
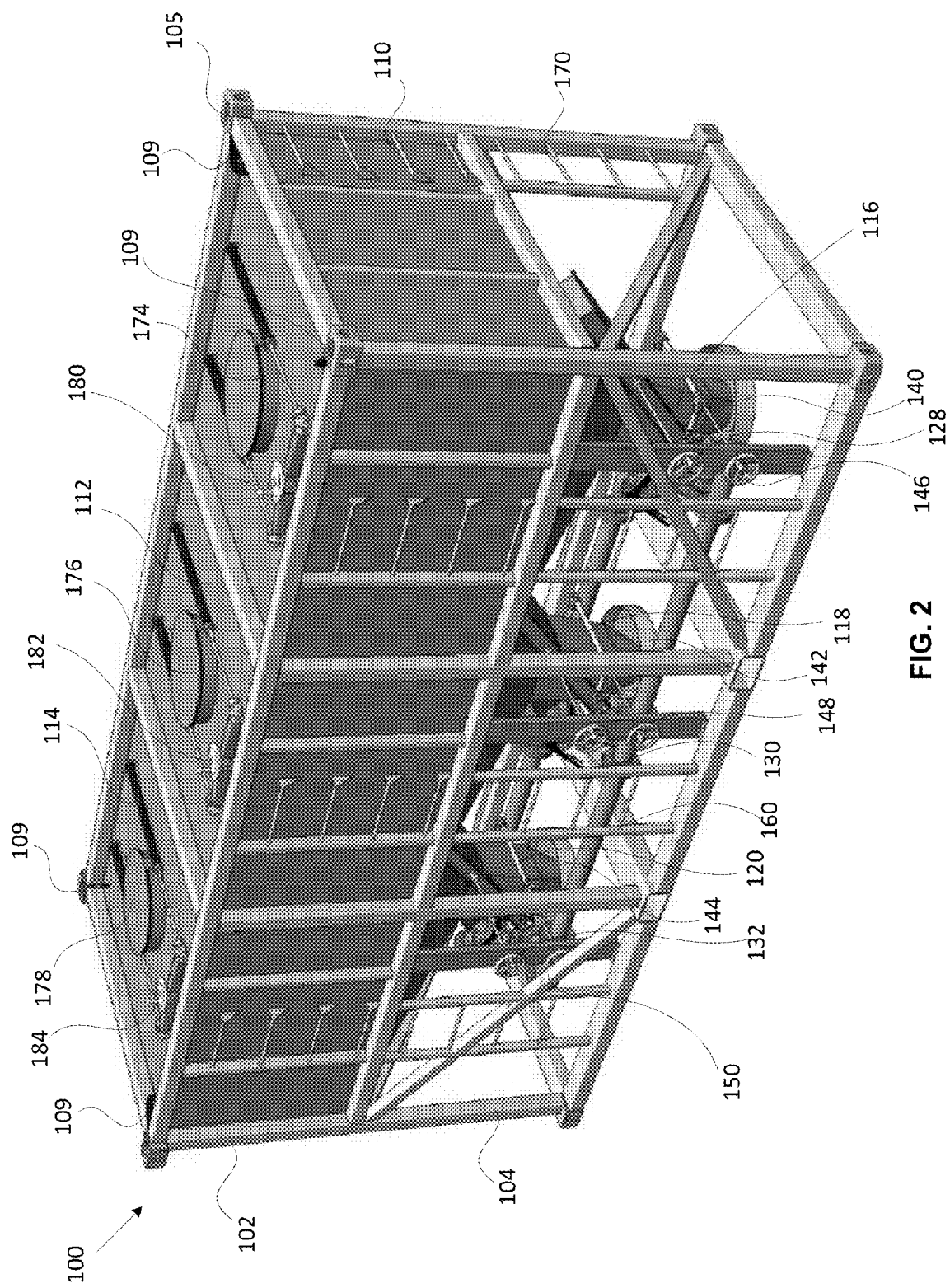
FIG. 2 is another upper perspective view of the interlocking container of FIG. 1.

Unless indicated otherwise, all indicated dimensions are in feet.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to embodiments of the present invention, an interlocking container includes a frame and one or more storage chambers. The frame is adapted to support multiple interlocking containers vertically stacked on top of the interlocking container. When multiple interlocking containers are stacked, storage chambers within one interlocking container are vertically aligned with storage chambers in other interlocking containers. Sealing members are used to operatively connect vertically aligned storage chambers. In this manner, the intermodal transportation of materials can be accomplished using less real estate, reducing transition times, and reducing lost materials. A conveyor box or conveyor unit is operatively coupled to the storage chambers of one of the interlocking containers, for example, the lowest interlocking container of the stack. The conveyor unit includes multiple transport mechanisms to facilitate the removal of materials from the storage chambers using different conveyance techniques, such as pulling the materials using negative pressures, blowing the materials using positive pressures, and mechanically moving the materials using a conveyor belt.

Figure 9:
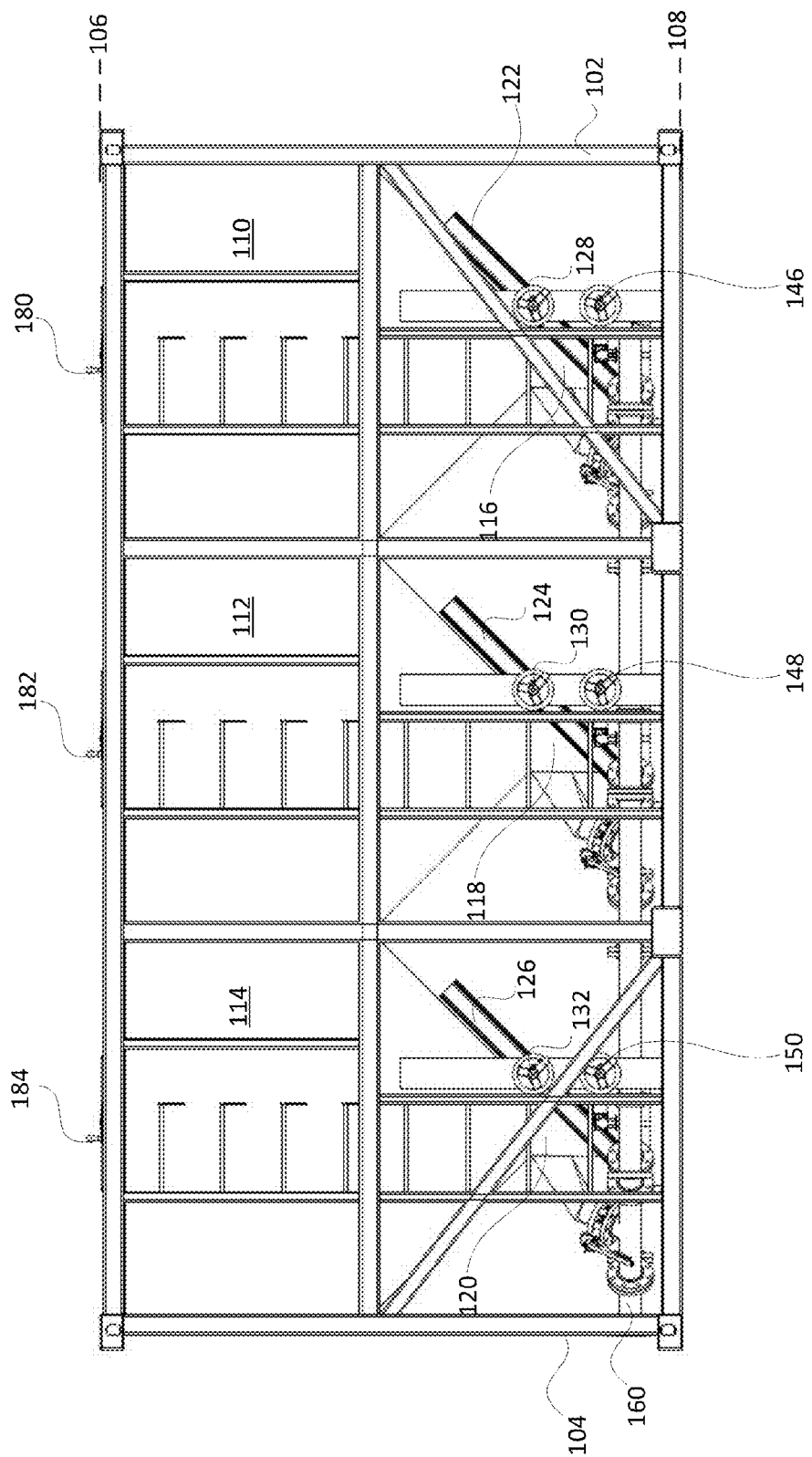
FIG. 9 is a side elevation view of the interlocking container of FIG. 1.
Figure 10:
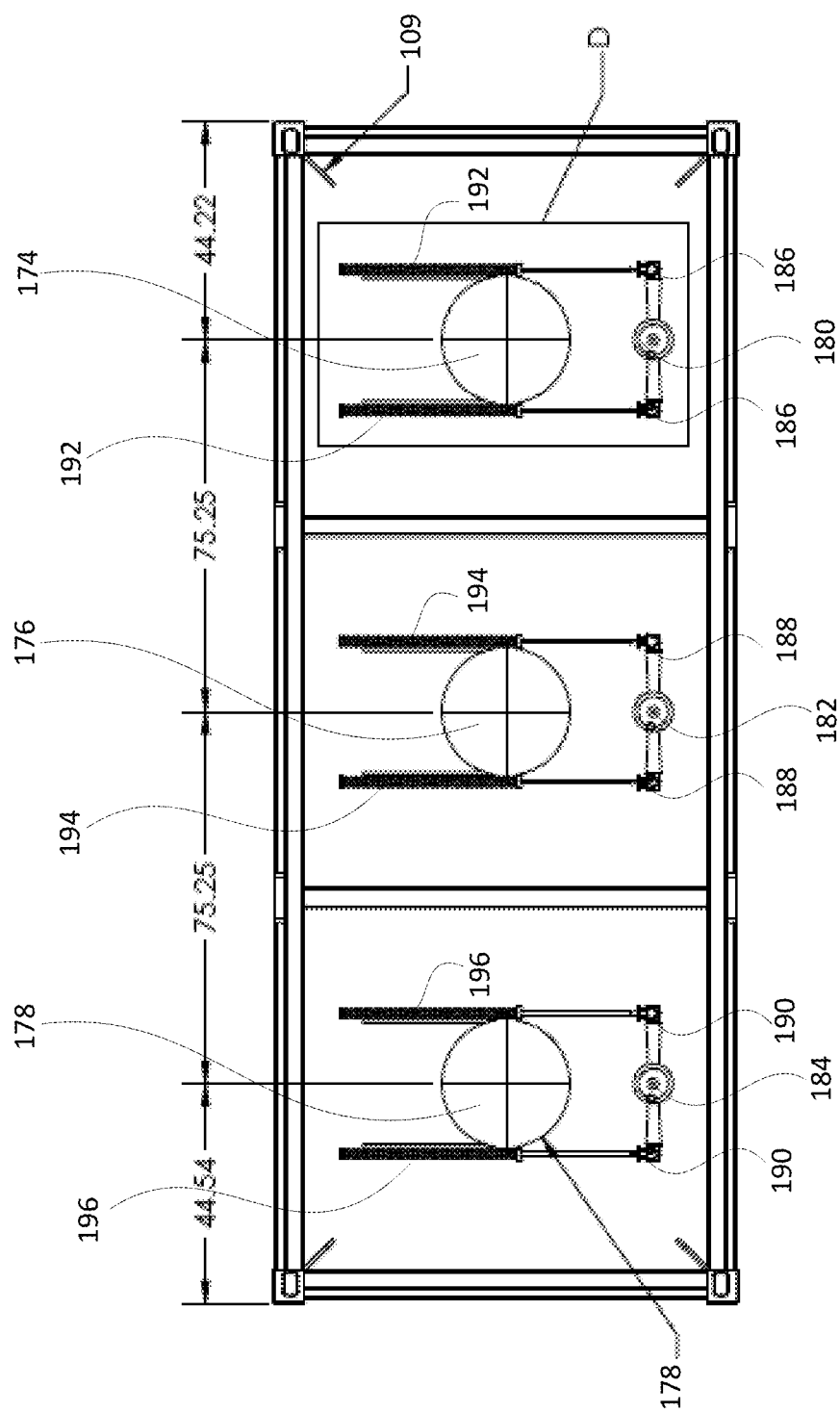
FIG. 10 is a top plan view of the interlocking container of FIG. 1.
Figure 11:
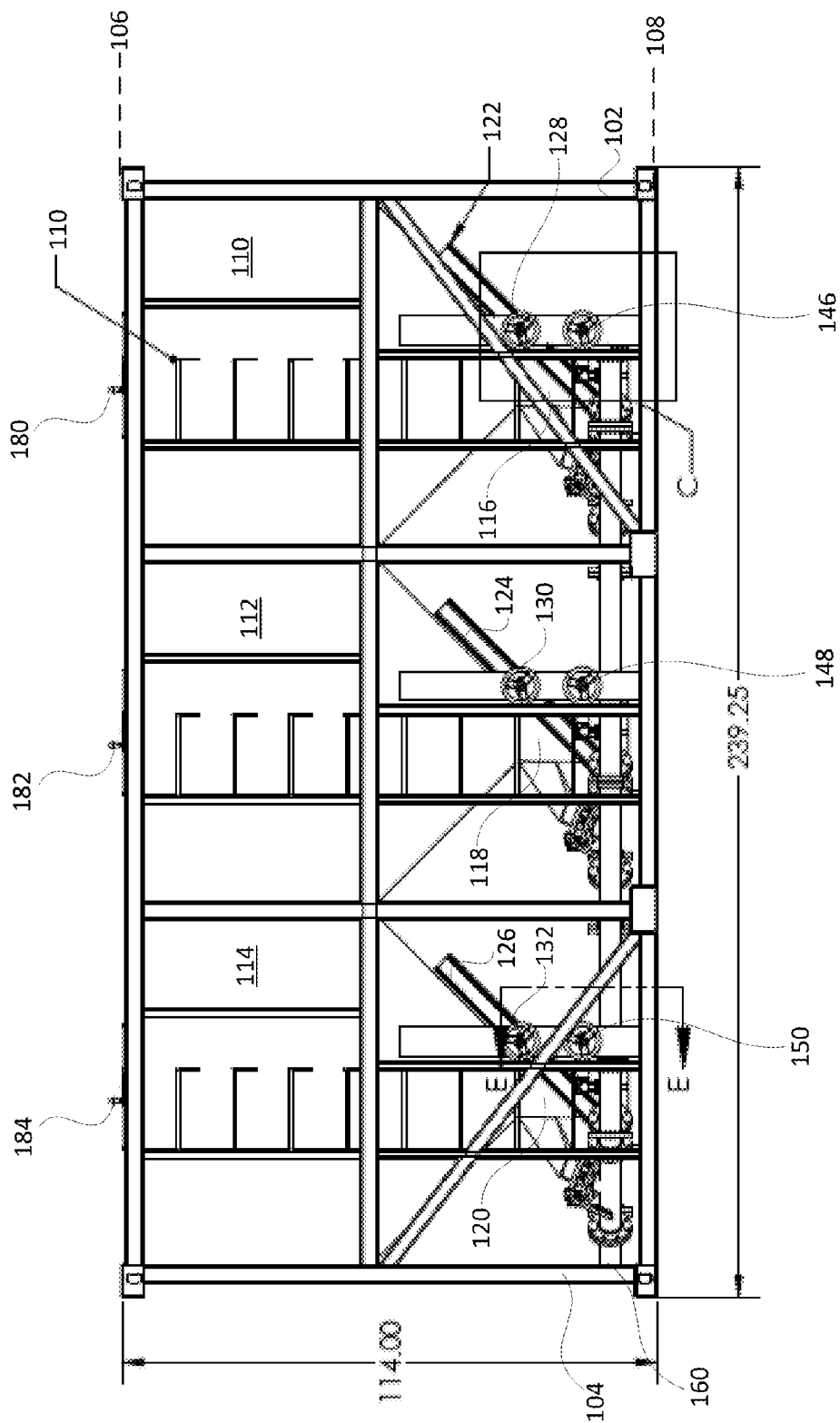
FIG. 11 is the side elevation view of FIG. 9 with additional markings.
Figure 12:
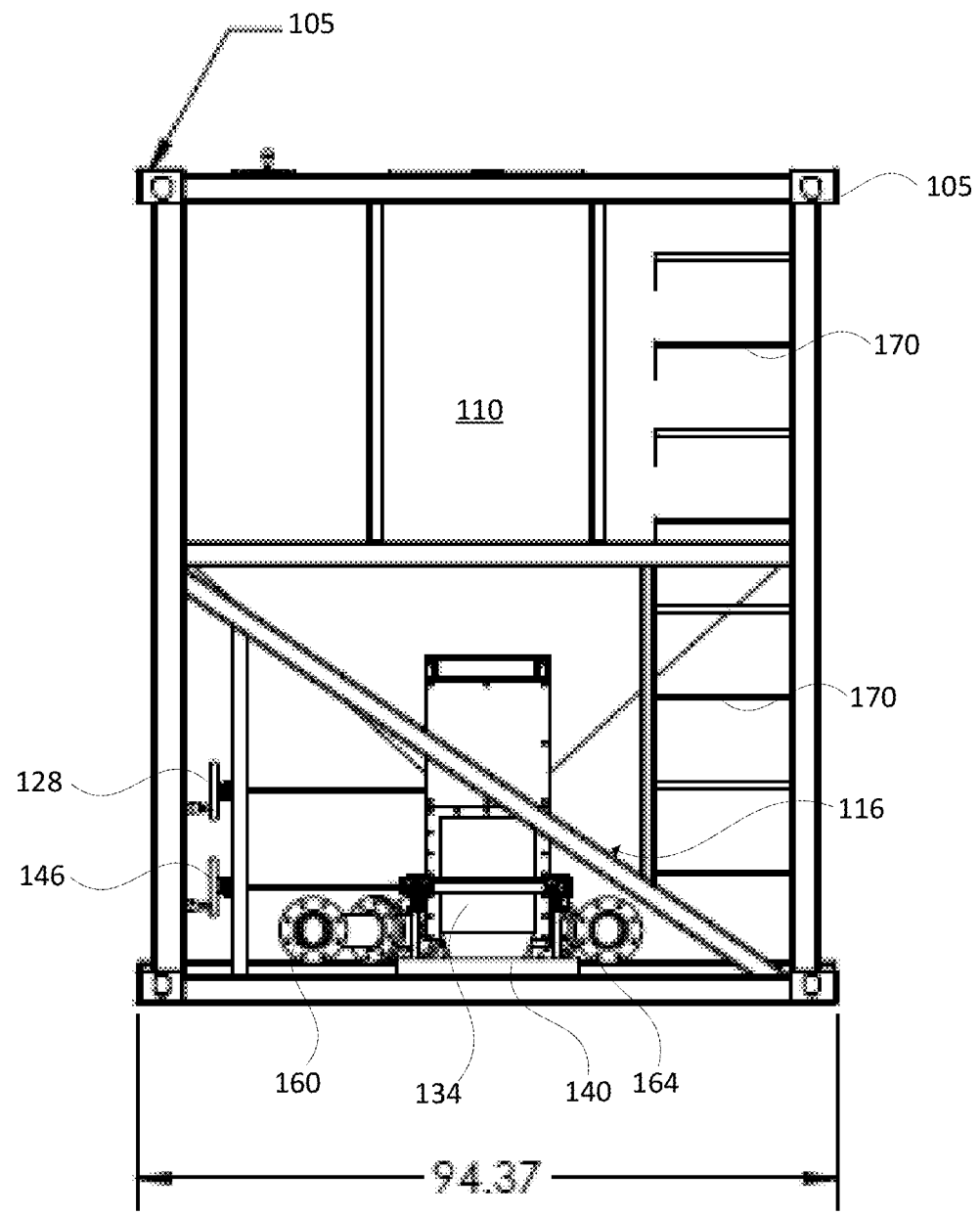
FIG. 12 is a front elevation view of the interlocking container of FIG. 1.
Figure 13:
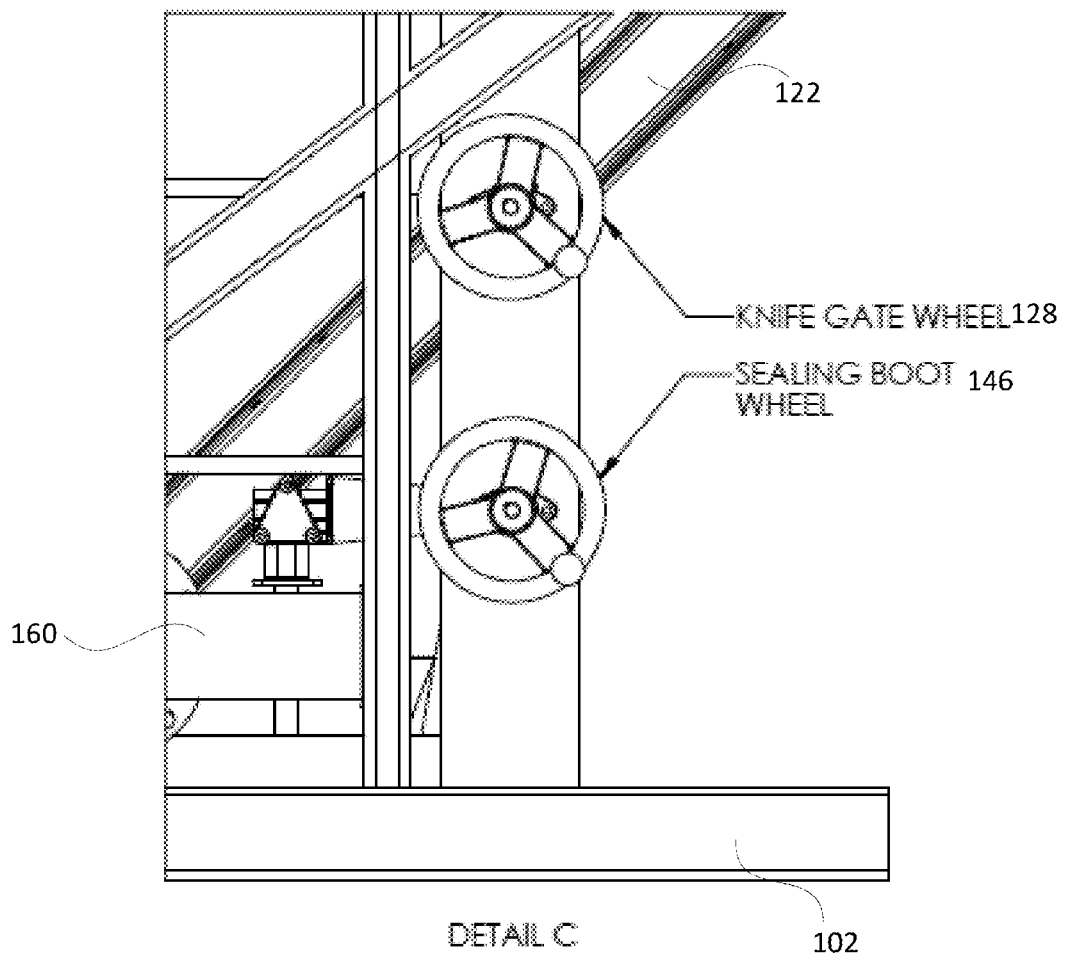
FIG. 13 is a side view of the interlocking container identified by the box "C" in FIG. 11.
Figure 14:
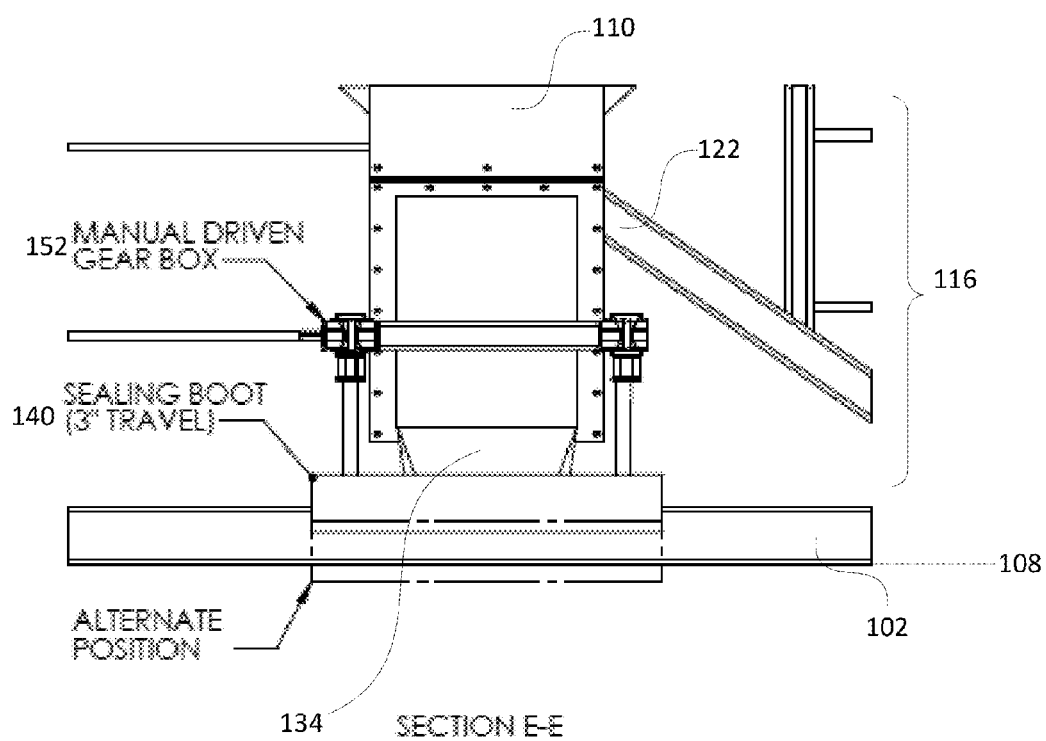
FIG. 14 is a cut-away view the interlocking container along the lines "E-E" in FIG. 11.
Figure 15:
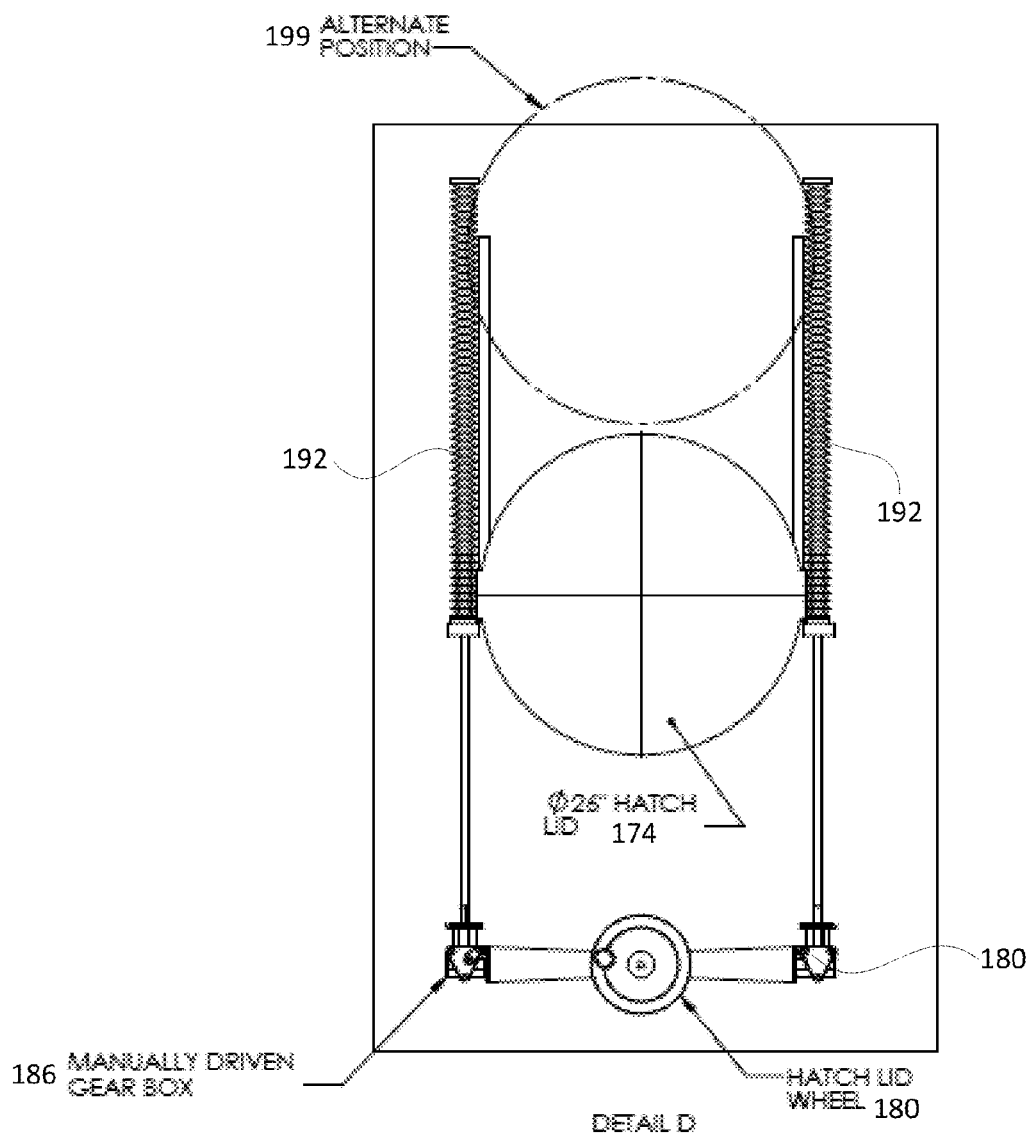
FIG. 15 is a top view of the interlocking container identified by the box "D" in FIG. 10.
Figure 46:
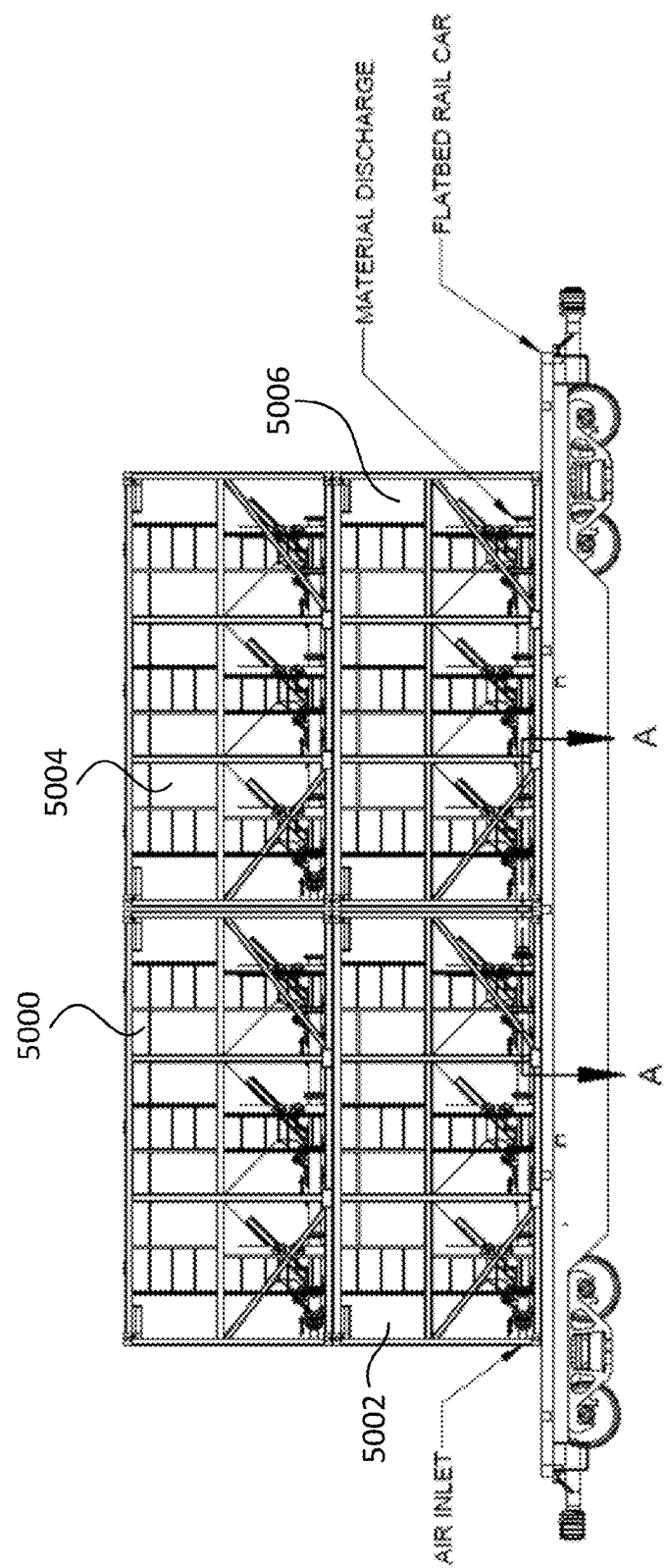
FIG. 46 is a side elevation view of four interlocking containers placed on a rail car, according to embodiments of the present invention.
Figure 48:
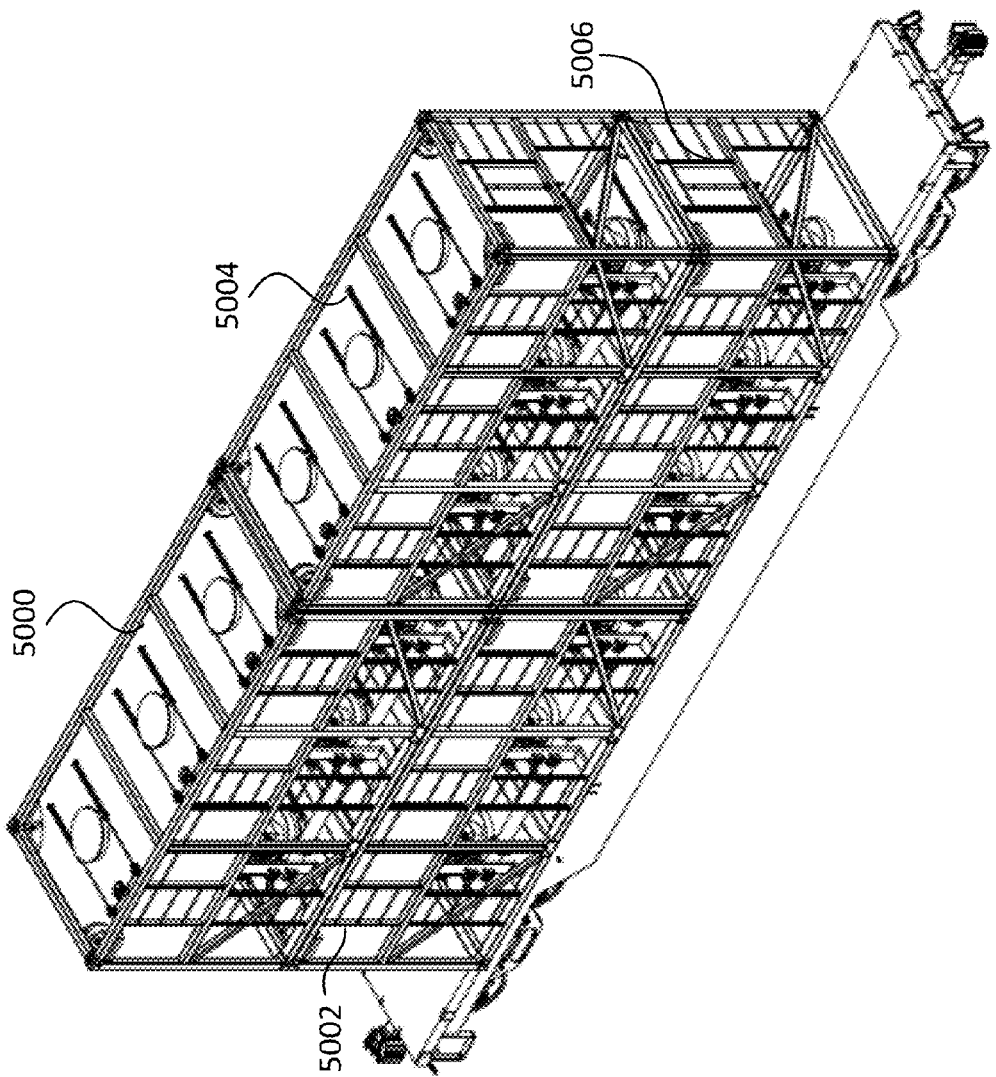
FIG. 48 is an upper perspective view of the four interlocking containers and rail car of FIG. 46.

As shown in FIGS. 1-15, an interlocking container 100 includes a frame 102 formed of various frame members, e.g., frame member 104, and corner castings, e.g., corner casting 105. In some embodiments, the frame 102 may be formed of steel, iron, or similar materials. In other embodiments, the frame 102 may be formed of lighter materials, such as aluminum. The frame 102 defines an upper plane 106 and a lower plane 108, which are shown in FIGS. 9 and 11. In some embodiments, the interlocking container 100 is placed on flatbed rail cars or similar transport mediums (e.g., as shown in FIGS. 46 and 48). To ensure a secure fit, the portions of the frame 102 defining the lower plane 108 (see FIGS. 9 and 11) are the lowest portions of the interlocking container 100, though as explained in more detail below, some components of the interlocking container may be extended through the lower plane 108 to contact vertically adjacent interlocking containers. The frame 102 also includes lifting lugs 109 that are used to couple the interlocking container 100 to cranes or other machines for moving, stacking, or aligning the interlocking container 100. The lifting lugs 109 may also be used to secure vertically adjacent interlocking containers 100.

Encompassed within the frame 102 are three storage chambers 110, 112, and 114. Coupled to each storage chamber 110, 112, 114 is a sealing member 116, 118, 120. As described below in more detail, the sealing members 116, 118, 120 are configured to selectively extend below the lower plane 108 in order to operatively couple the storage chambers 110, 112, 114 to vertically adjacent storage chambers.

Each storage chamber 110, 112, 114 includes a gate 122, 124, 126, such as a knife gate or knife gate valve, which selectively opens and closes an outlet in a lower portion or surface of each storage chamber 110, 112, 114. In some embodiments, a knife gate wheel 128, 130, 132 is used to manually open and close a respective outlet in each storage chamber 110, 112, 114. In other embodiments, other manual or automated mechanisms may be used to open and close the outlets in the storage chambers 110, 112, 114.

The sealing members 116, 118, 120 each include an extension section 134, 136, 138 and a sealing boot 140, 142, 144, also referred to as a hatch seal. The sealing boots 140, 142, 144 may be formed of rubber or similar materials in order to create impermeable seals between a sealing boot 140, 142, 144 and an inlet into a storage chamber. The impermeable seals, in some embodiments, are impermeable to water and/or air.

Figure 4:
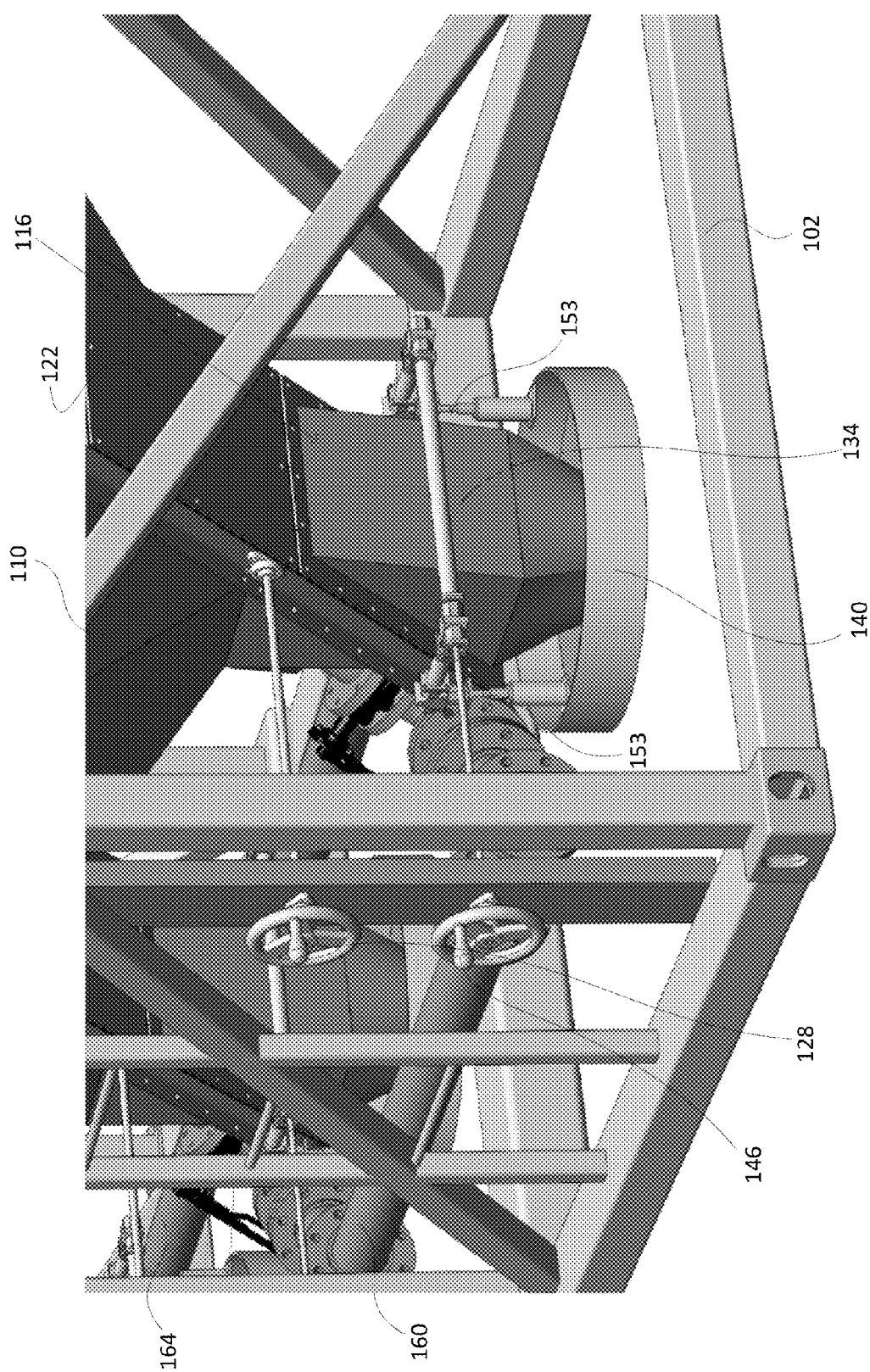
FIG. 4 is a perspective view of a sealing member and other components of the interlocking container of FIG. 1 in which the sealing member is in the retracted position.
Figure 5:
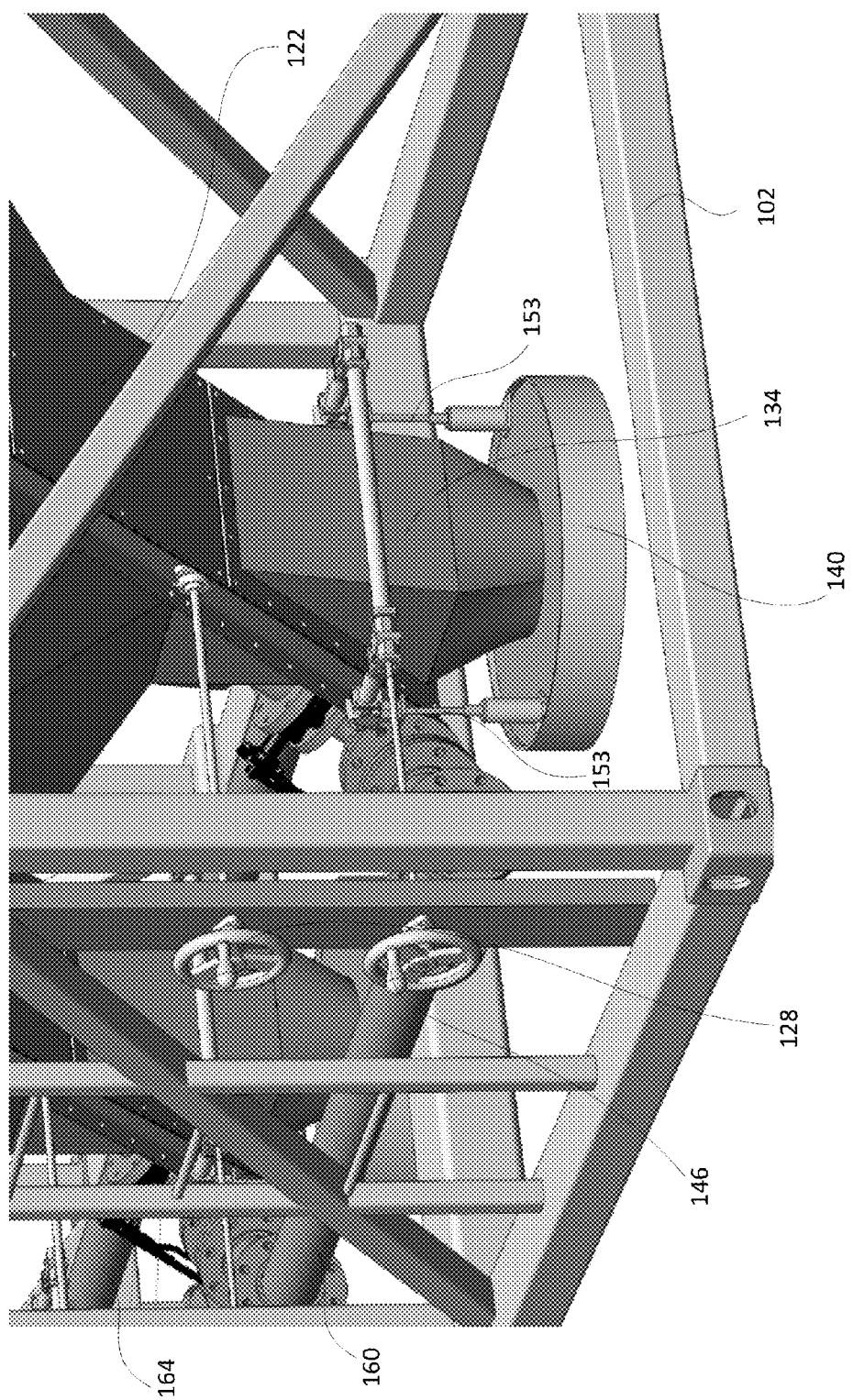
FIG. 5 is a perspective view of the sealing member of FIG. 4 in which the sealing member is in the extended position.
Figure 6:
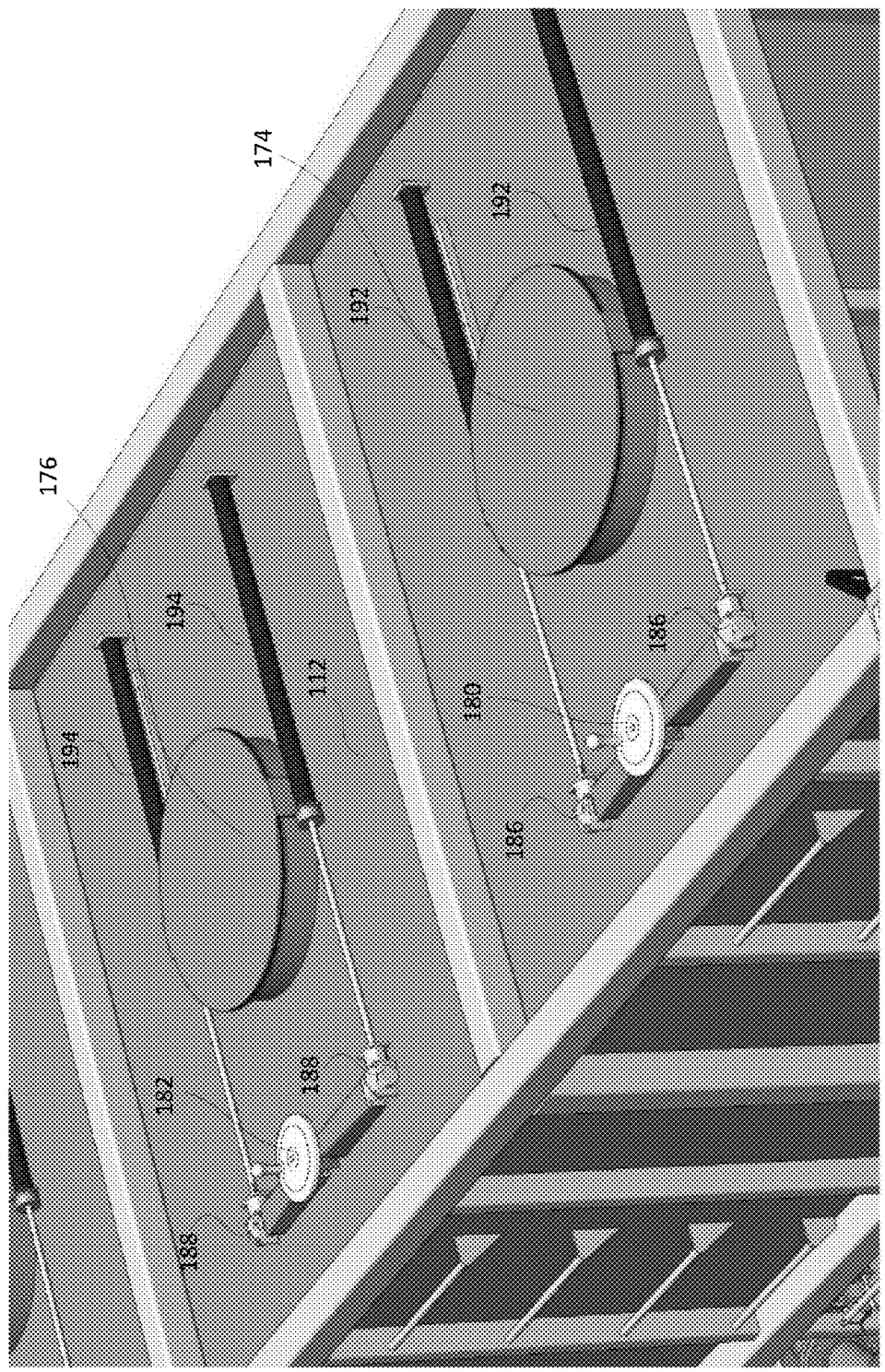
FIG. 6 is an upper perspective view of the hopper caps and other components of the interlocking container of FIG. 1 in which the hopper caps are in the closed position.

Each extension section 134, 136, 138 is driven by a sealing boot wheel 146, 148, 150 (also referred to as a hatch seal or hand wheel) that, when operated, engages a gearbox 152, 154, 156 that drives lead screws (e.g., lead screws 153 in FIG. 4)

and an extension section 134, 136, and 138. In this manner, each sealing member 116, 118, 120 may be driven between a retracted position in which the sealing boots 140, 142, 144 are above the lower plane 108 (as shown in, e.g., FIG. 4) and an extended or engaged position (as shown in, e.g., FIG. 5) in which the sealing boots 140, 142, 144 extend below the lower plane 108. In other embodiments, other manual or automated mechanisms may be used to drive the sealing members 116, 118, 120 between the retracted and extended positions. The distance between the retracted position and the extended position may be, e.g., approximately three inches.

In some embodiments, the interlocking container 100 includes a pressure system 160, also referred to as a Venturi system, which is used to reduce pressure within the storage chambers 110, 112, 114. The pressure system 160 includes a primary pipe and a series of pinch valves. The primary pipe couples to a compressor that imparts a vacuum within the primary pipe. The pinch valves are used to selectively expose individual storage chambers 110, 112, 114 to the vacuum. Reducing pressure (i.e., applying the vacuum or applying negative pressure) removes air pockets formed among the materials in the storage chambers 110, 112, 114. That lower pressure and reduction in air pockets helps to facilitate the removal of the materials from the storage chambers 110, 112, 114. In some embodiments, the interlocking container 100 includes additional mechanisms, such as a motor driven corkscrew within a pipe 164, that facilitate the removal of the materials from the storage chambers 110, 112, 114. In some embodiments in which multiple interlocking containers are operatively coupled, many or all of the interlocking containers do not have a separate pressure system 160 and/or active mechanisms for material extraction, such as a cork-screw operating within the pipe 164.

In some embodiments, ladders (e.g., ladder 170) are integrated within the frame 102 to facilitate access to, and the operation of, various components (e.g., the wheels 128, 130, 132, 146, 148, and 150) on different portions of the interlocking container 100 from the exterior of the interlocking container 100. In addition to ladders, the frame 102 may incorporate slide bars or non-slip plates that allow individuals to quickly move from one storage chamber to a horizontally adjacent storage chamber.

Figure 3:
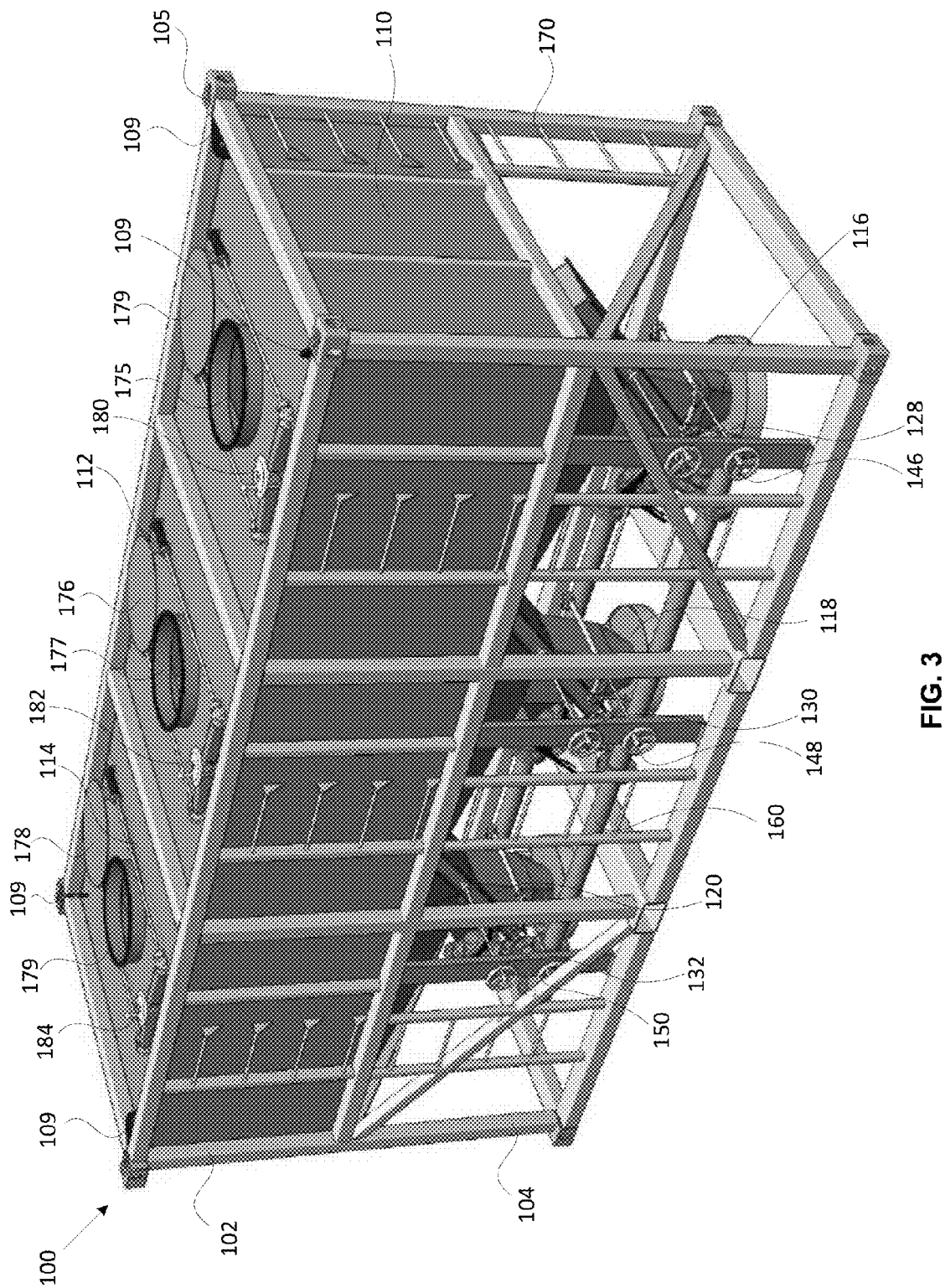
FIG. 3 is an upper perspective view of the interlocking container of FIG. 1 in which the hopper caps are in the open position.
Figure 7:
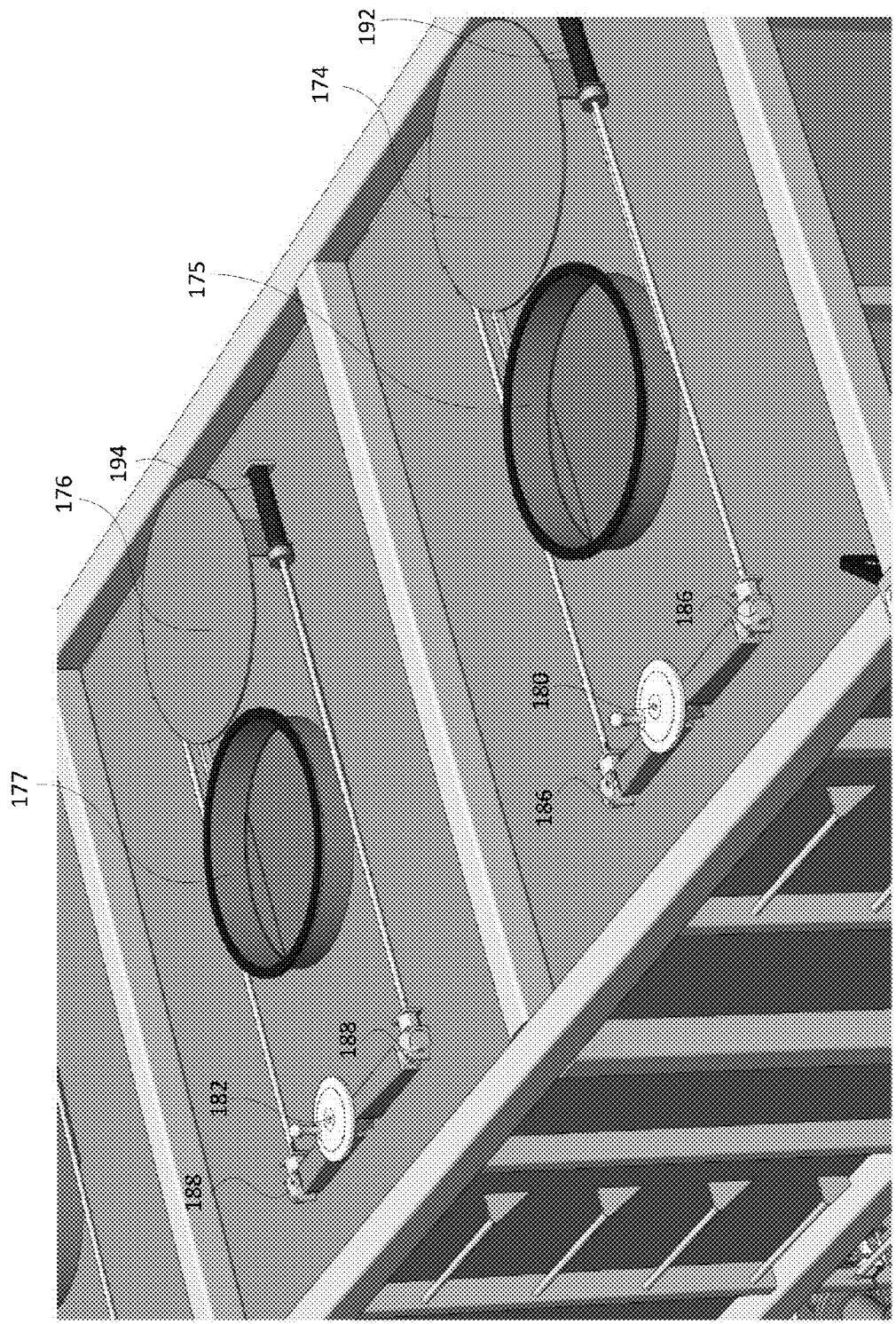
FIG. 7 is an upper perspective view of the hopper caps and other components of the interlocking container of FIG. 1 in which the hopper caps are in the open position.
Figure 8:
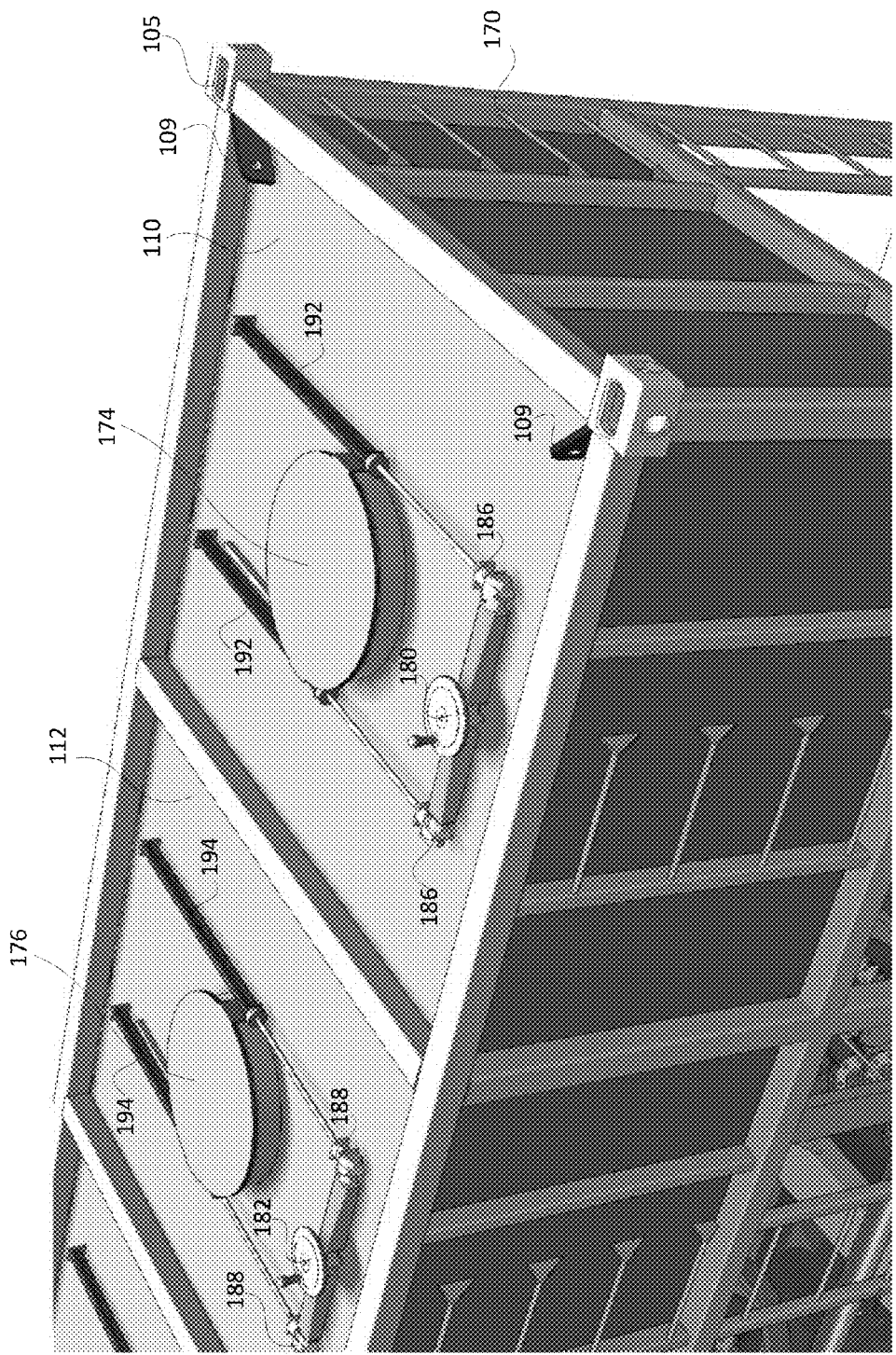
FIG. 8 is another upper perspective view of the hopper caps and other components of the interlocking container of FIG. 1 in which the hopper caps are in the closed position.

As shown in, e.g., FIG. 3, each storage chamber 110, 112, 114 includes a hopper lid 174, 176, 178, also referred to as a hopper cap, that covers a hatch opening or inlet 175, 177, 179, into the storage chambers 110, 112, 114. Hopper lid wheels 180, 182, 184, which in some embodiments utilize a folding handle, are used to drive gear boxes 186, 188, 190 and screws 192, 194, 196 that cause the hopper lids 174, 176, 178 to slide from a closed position (as shown in, e.g., FIG. 6) in which the hopper lids 174, 176, 178 seal the inlets 175, 177, 179 to the storage chambers 110, 112, 114 into an open position (as shown in FIG. 7) in which the hopper lids 174, 176, 178 do not seal the inlets 175, 177, 179 to the storage chambers 110, 112, 114. In other embodiments, other manual or automated means may be used to drive the hopper lids 174, 176, 178 between the open and closed positions.

As noted above, interlocking containers (e.g., multiple interlocking containers 100) may be vertically stacked and interlocked, and the sealing members may be used to couple vertically adjacent storage chambers. For example, FIGS. 16-17 and 23-27 illustrate embodiments in which two interlocking containers 200, 300 are stacked on top of each other. The frames of the interlocking containers 200, 300 may be secured to each other using the lifting lugs. As can be seen from, e.g., FIG. 16, stacking multiple interlocking containers does not increase the footprint of the bottom interlocking container. In this manner multiple interlocking containers may be stacked and secured without substantially increasing the real estate required to store the additional interlocking containers. FIGS. 18-22 illustrate embodiments in which four interlocking containers are vertically stacked.

Figure 16:
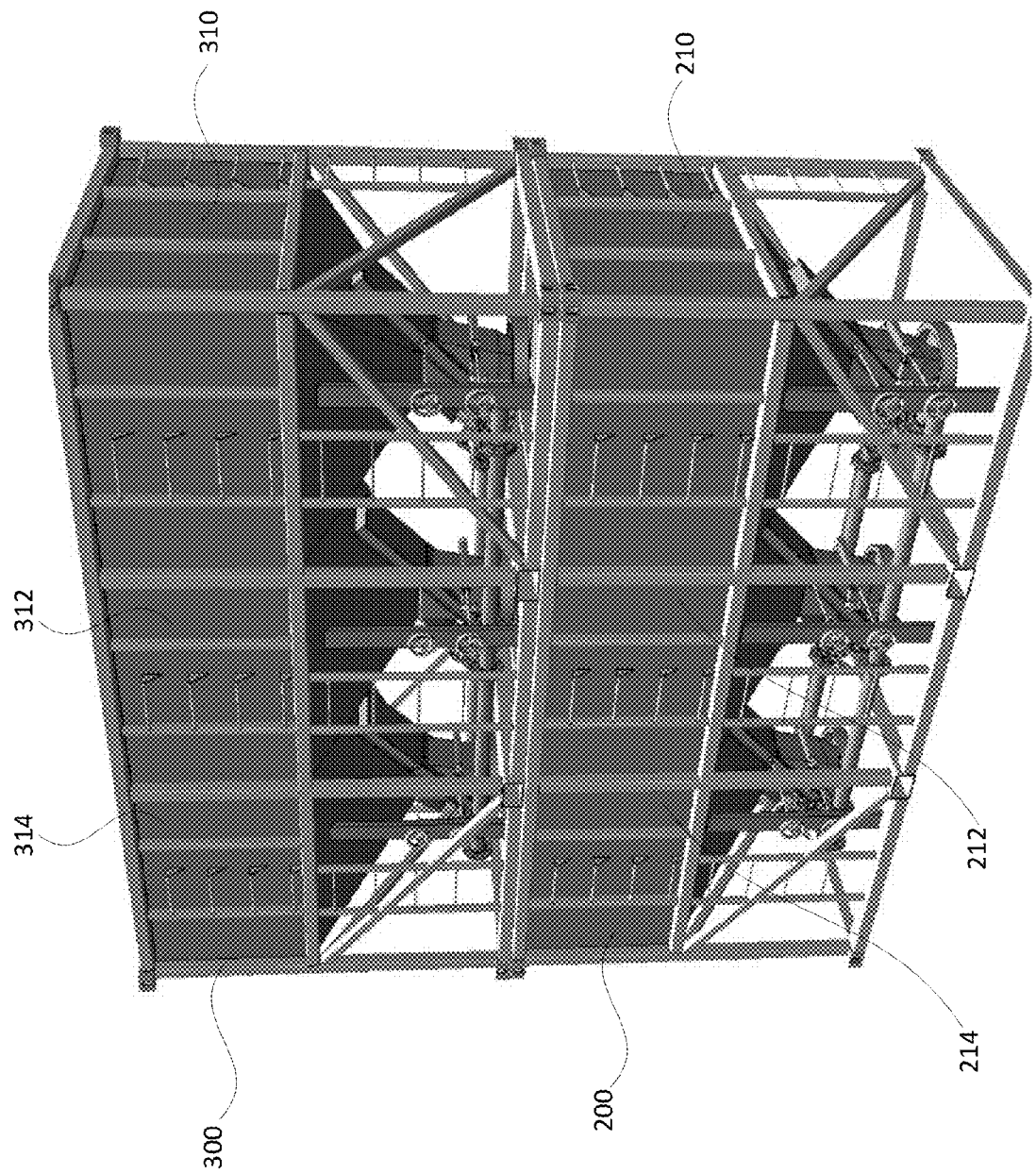
FIG. 16 is a perspective view of two interlocking containers in a stacked configuration, according to embodiments of the present invention.
Figure 17:
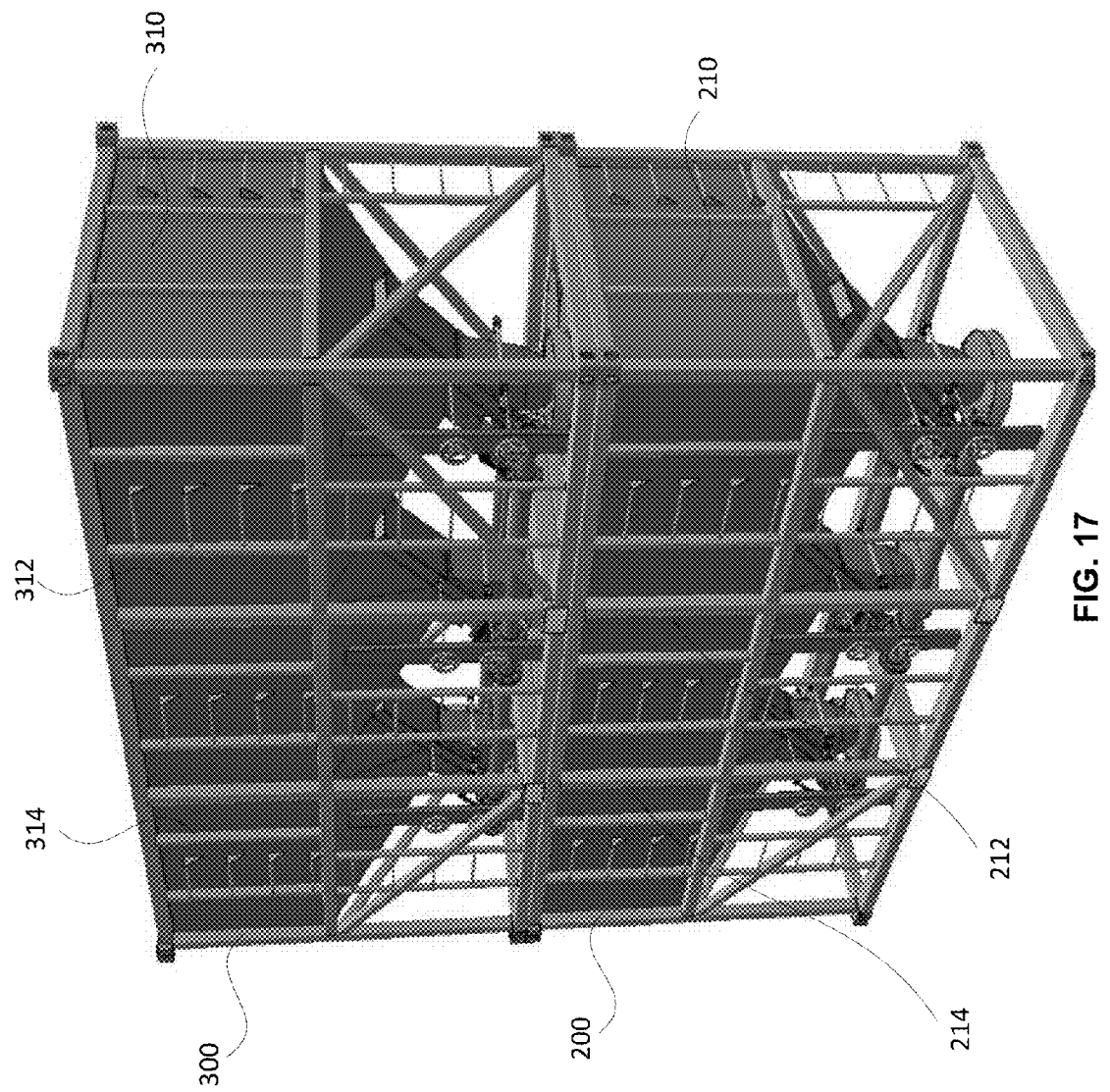
FIG. 17 is a perspective view of the two interlocking containers of FIG. 16 in an interlocked configuration.
Figure 18:
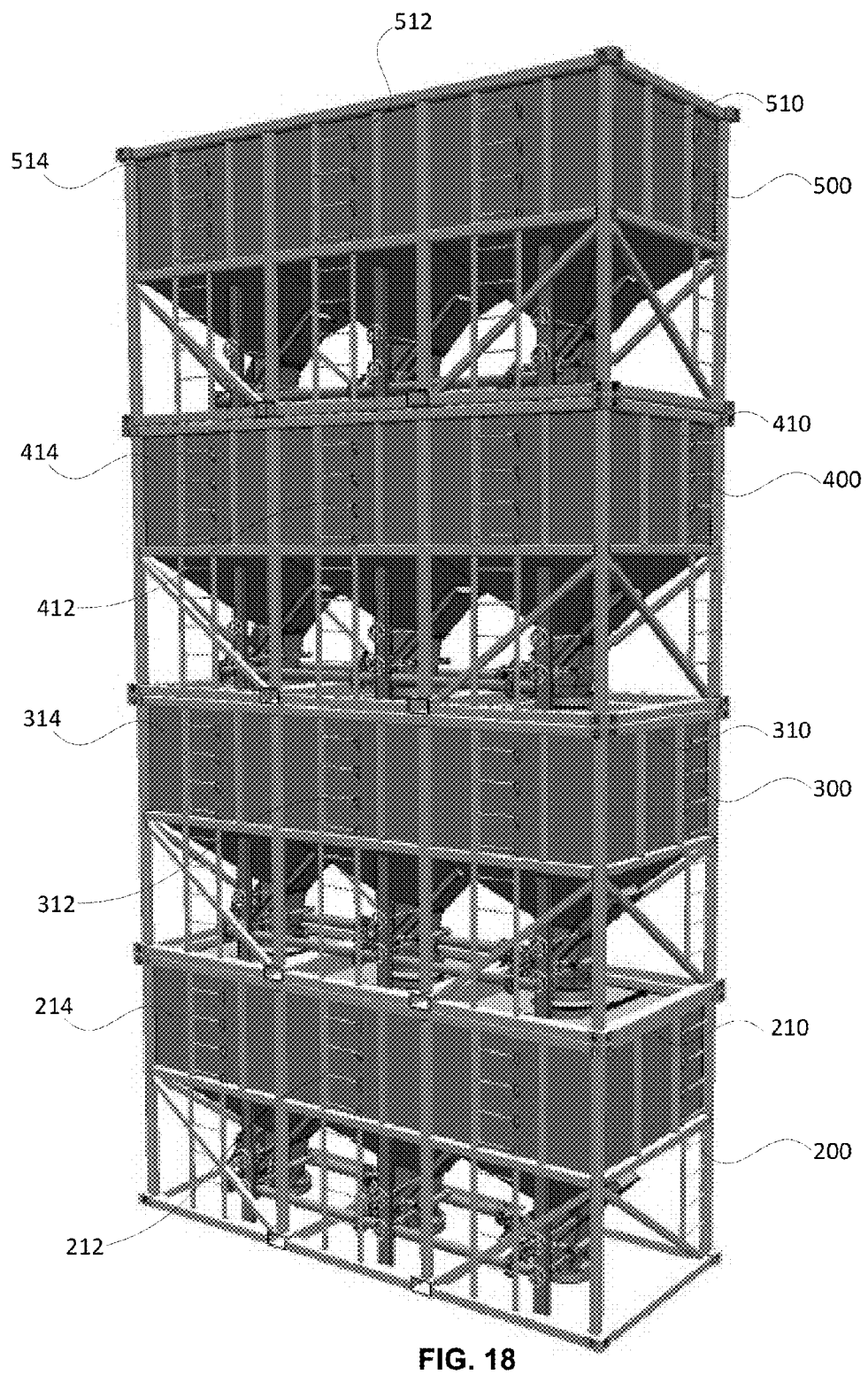
FIG. 18 is a perspective view of four interlocking containers in a stacked configuration, according to embodiments of the present invention.

Stacking the interlocking containers (e.g., interlocking containers 200, 300 in FIG. 16) aligns the storage chambers in each interlocking container. As shown in FIG. 16, storage chamber 210 is vertically aligned with storage chamber 310, storage chamber 212 is vertically aligned with storage chamber 312, and storage chamber 214 is vertically aligned with storage chamber 314. The hopper lids of the bottom interlocking container 200 are moved (e.g., by actuating the hatch lid wheels, which drive gear boxes and screws) from the closed position to the open position, enabling access to the interior of the storage chambers.

Figure 26:
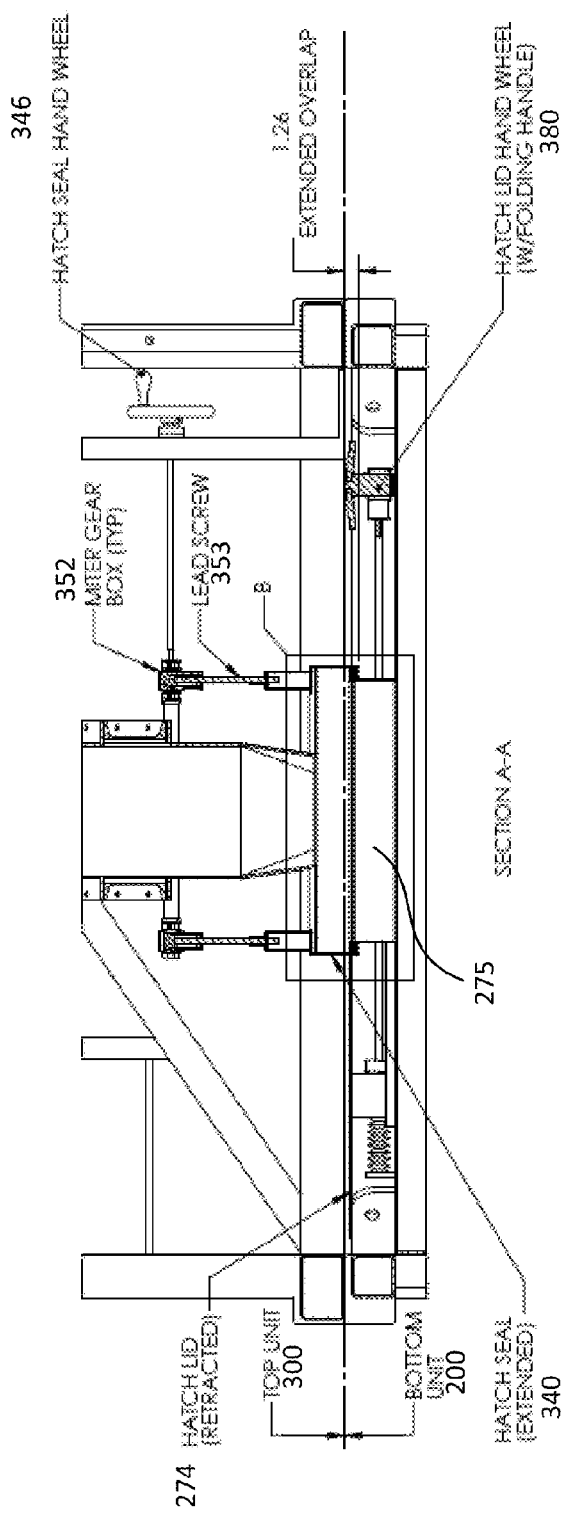
FIG. 26 is a cut-away view of the two interlocking containers of FIG. 23 along the lines "A-A" in FIG. 23.
Figure 27:
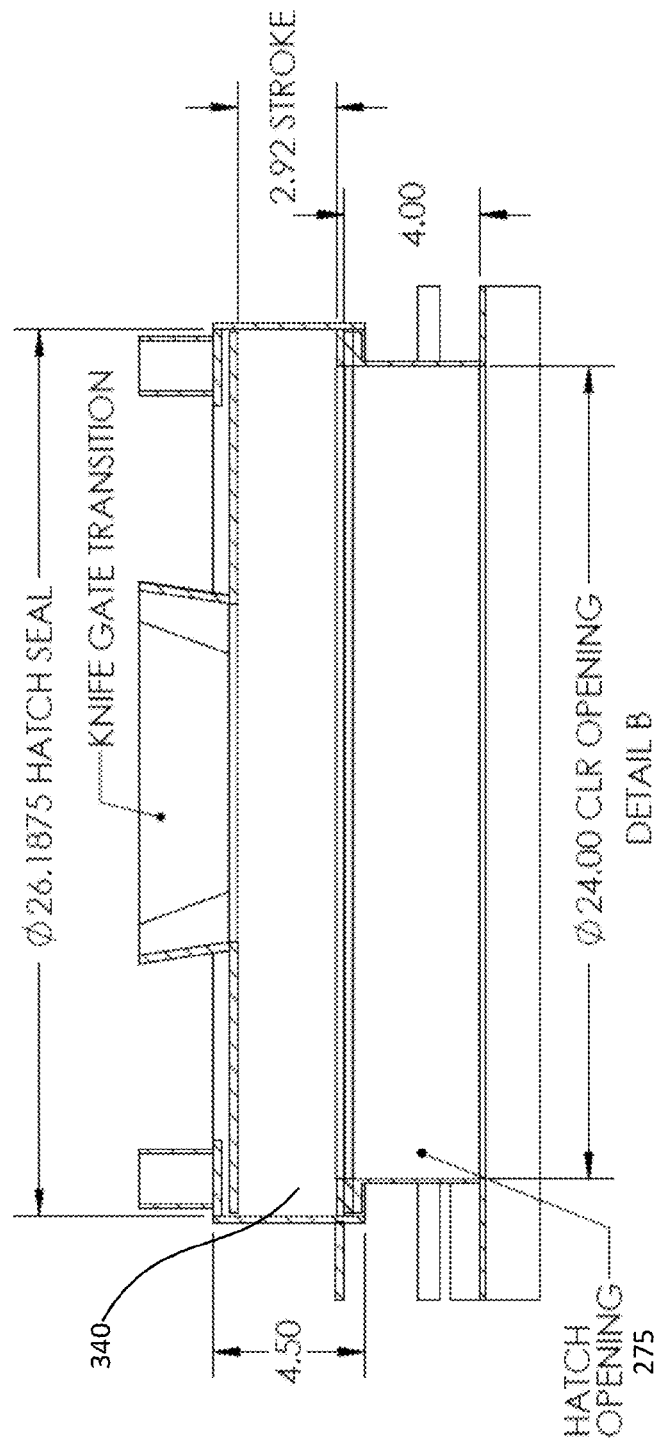
FIG. 27 is a view of the sealing member of the top interlocking container of FIG. 23 and the opening of the bottom interlocking container of FIG. 23 as identified by the box "B" in FIG. 26.

Once the hopper lids are in the open position, the sealing members on the upper interlocking container 300 are driven into the extended position (e.g., by actuating the sealing boot wheels, which engage gearboxes driving the extension sections) so that the sealing boots contact the inlets of the storage chambers 210, 212, 214. Each sealing boot creates a seal with the portions of a storage chamber defining an inlet to prevent stored material from escaping (e.g., crystalline silica dust) and/or to prevent external material (e.g., moisture) from entering. Once the sealing boots have engaged the inlets of the storage chambers, the two interlocking containers are in their interlocked configuration. FIGS. 26 and 27, for example, depict a seal formed between a sealing boot or hatch seal (340 in FIG. 26) of a storage chamber of an upper interlocking container and an inlet (275 in FIG. 26) of a storage chamber of a lower interlocking container when the sealing member is in the extended position.

Once those seals are in place, the knife gate valves are opened. The materials within the storage compartments of the upper interlocking container will be pulled by gravity into the storage compartments of the lower interlocking container. As a result, all of the materials stored in the series of vertically connected storage compartments may be accessed through the storage compartment in the bottom interlocking container. In some embodiments, movement of the material from one storage compartment to another is facilitated by the application of a pressure (either positive or negative) to the storage chambers, either by a pressure system (e.g., pressure system 160 discussed above) on one of the interlocking containers or by an external system, e.g., as incorporated into the conveyor box discussed below.

Figure 19:
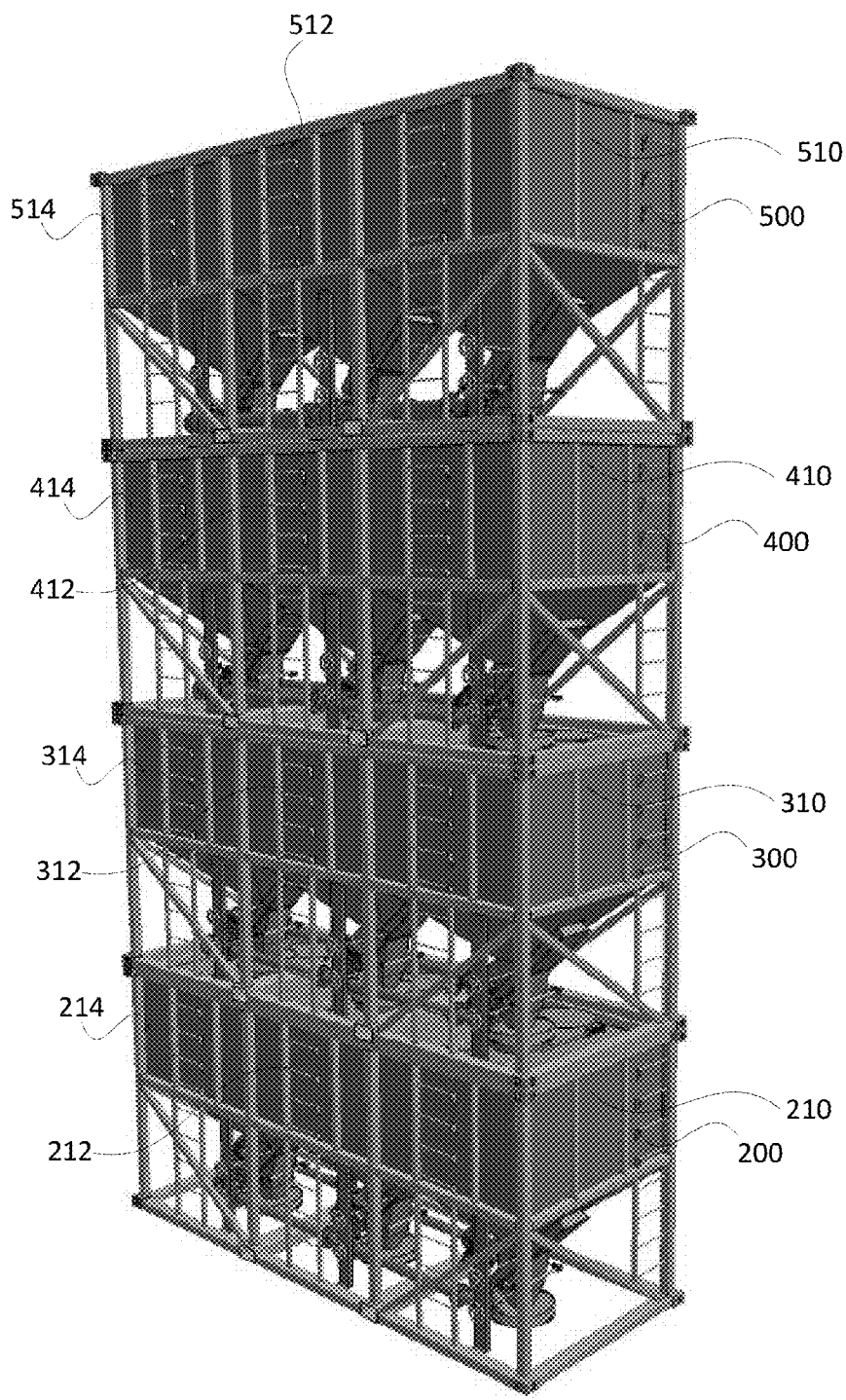
FIG. 19 is perspective view of the four interlocking containers of FIG. 18 in an interlocked configuration.
Figure 20:
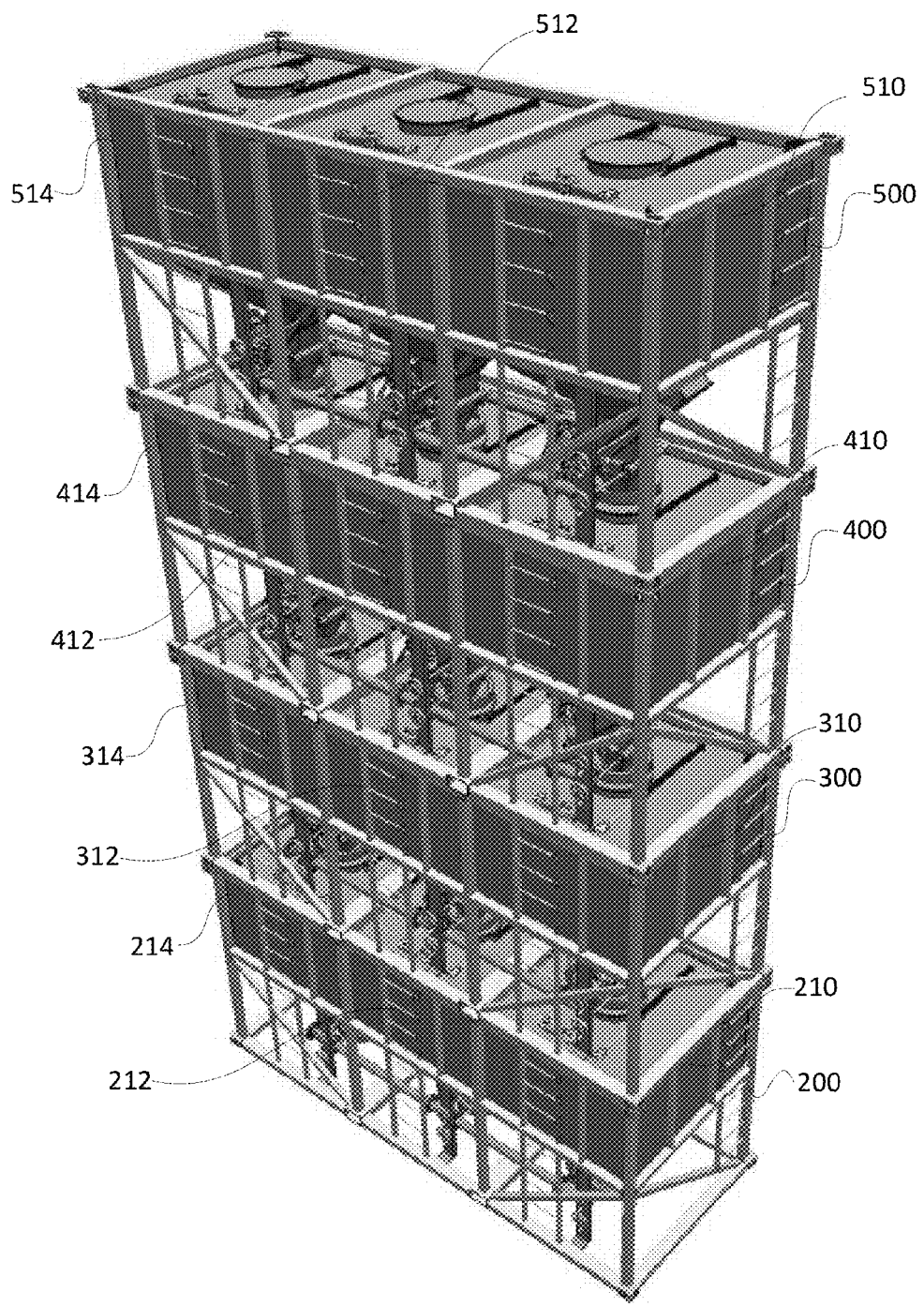
FIG. 20 is an upper perspective view of the four interlocking containers of FIG. 18.
Figure 22:
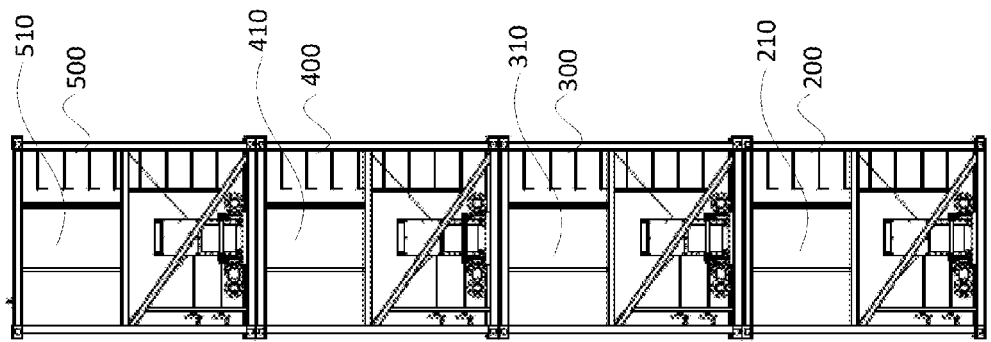
FIG. 22 is a front elevation view of the four interlocking containers of FIG. 18.
Figure 21:
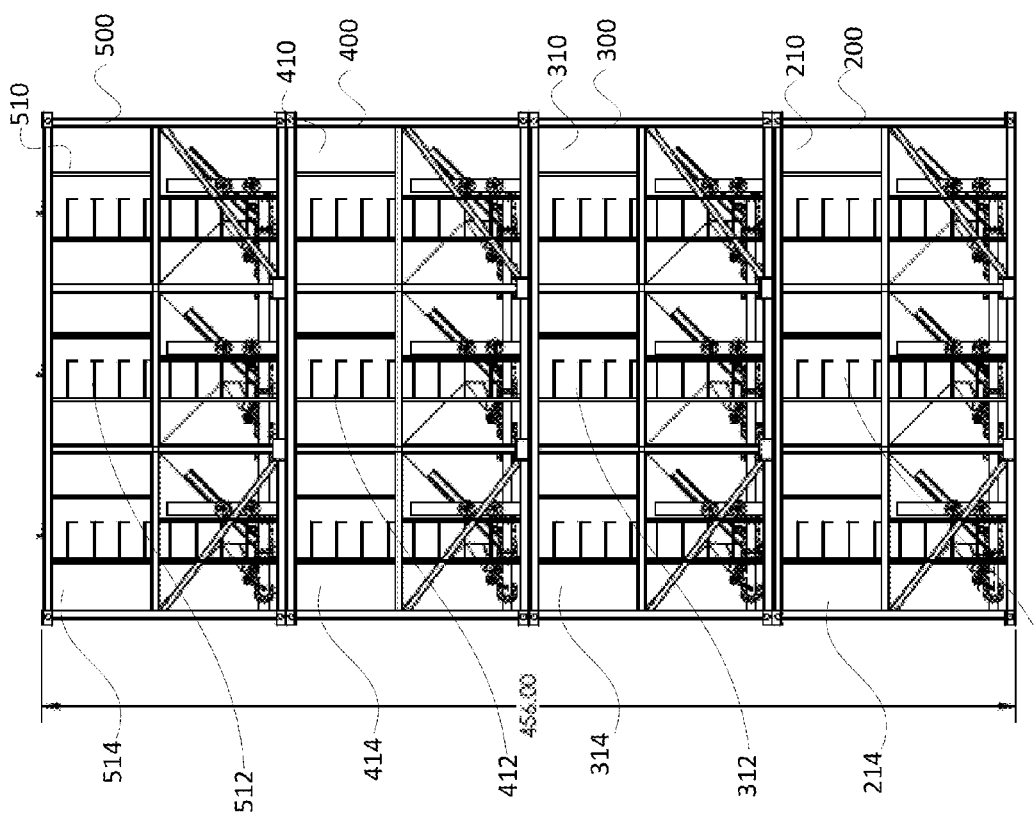
FIG. 21 is a side elevation view of the four interlocking containers of FIG. 18.
Figure 23:
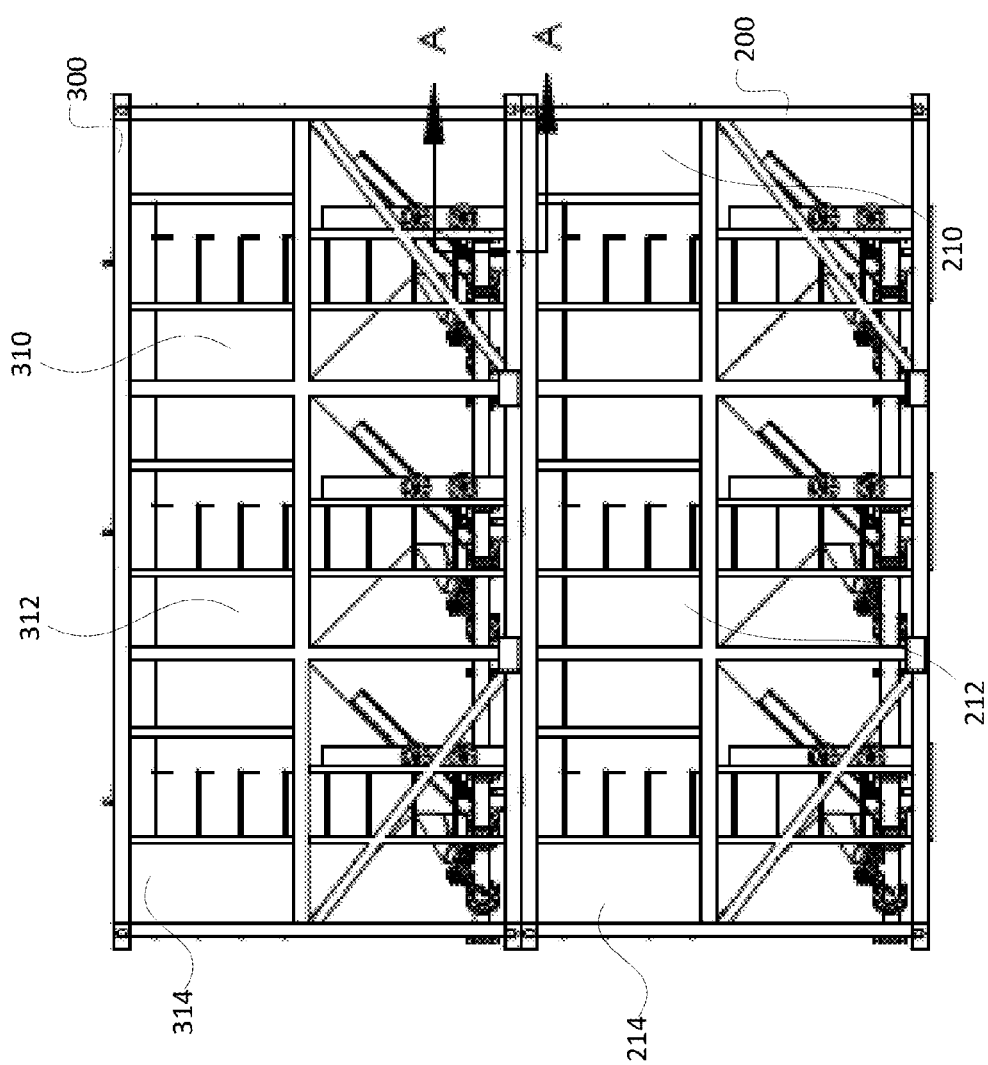
FIG. 23 is a side elevation view of two interlocking containers in an interlocked configuration, according to embodiments of the present invention.
Figure 24:
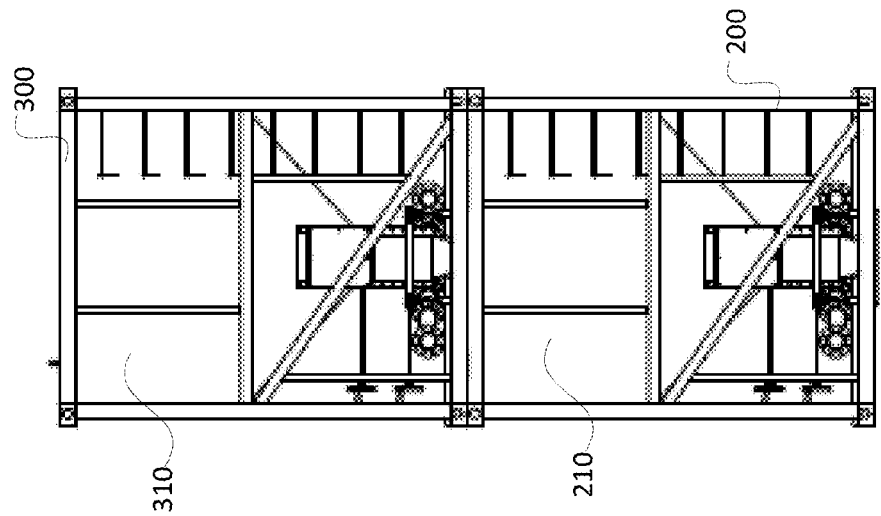
FIG. 24 is a front elevation view of the two interlocking containers of FIG. 23.
Figure 25:
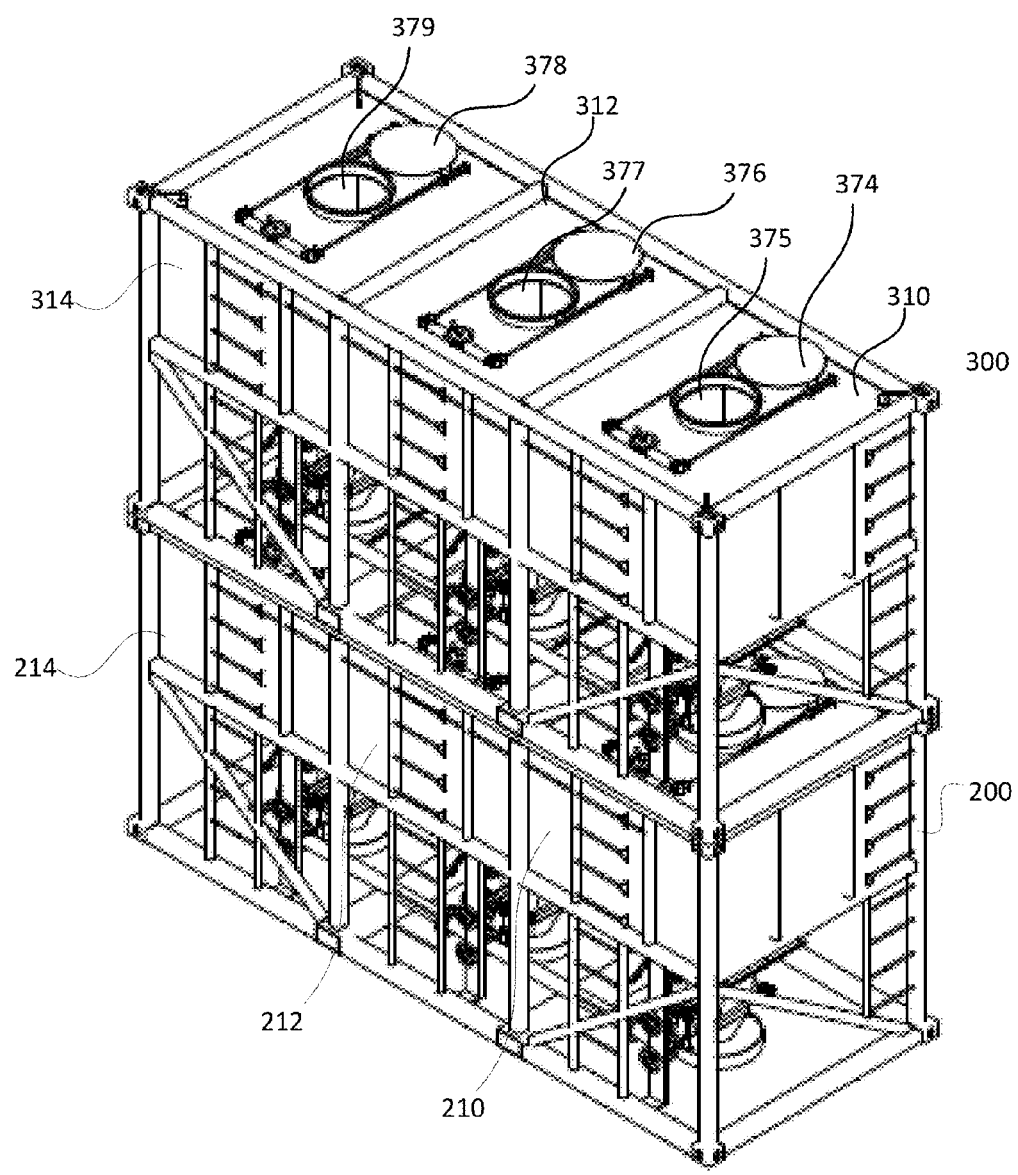
FIG. 25 is an upper perspective view of the two interlocking containers of FIG. 23.

As shown in, e.g., FIG. 19, four interlocking containers (200, 300, 400, and 500) may be interlocked so that their respective storage compartments (210, 310, 410, and 510; 212, 312, 412, and 512; and 214, 314, 414, and 514) are aligned and coupled.

In some embodiments, the interlocking container is able to facilitate the removal of materials using a variety of techniques. For example, materials may be blown out using positive pressure, materials may be removed using a negative pressure (e.g., using a Venturi system), and/or materials may be removed mechanically, e.g., using a motor-driven corkscrew. Thus, each interlocking container has multiple mechanisms for loading or unloading material into the storage compartments. Because technical abilities vary from location to location, this flexibility enables the interlocking container to be used in many locations without significant changes to the interlocking container or the need to transfer stored materials to different containers. In some embodiments, these transportation mechanisms are located on an external component (e.g., the conveyor unit discussed below) and not on the interlocking containers. In other embodiments, only the bottom interlocking container incorporates these transportation mechanisms.

In some embodiments, an interlocking container includes a series of transportation pipes, which may include, e.g., the pressure system 160 of FIG. 1. In particular, FIGS. 28-29 illustrate a conveyance system 600 that includes three connecting portions 610, 612, 614 that couple with three storage chambers. Each connecting portion 610, 612, 614 includes a valve 616, 618, 620 (e.g., a butterfly valve), and a reducer 622, 624, 626. Each connecting portion 610, 612, 614 may also include an air nozzle and a discharge nozzle. These components facilitate the application of reduced or negative pressure to the storage chamber as air flows through an air inlet pipe 640, through the connecting portions 610, 612, 614 and out of an outlet pipe 642. Materials exit the storage chambers, enter the connecting portions, and are then conveyed through the outlet pipe 642. Mechanical transport mechanisms, such as screws, may be used to assist the movement of the materials through the outlet pipe 642. In FIGS. 28 and 29, item 1 is a reducing tee, item 2 is a reducer, item 3 is a Wye Branch, item 4 is a discharge nozzle, item 5 is an air nozzle, item 6 is an onyx pinch valve, item 7 is a butterfly valve, item 8 is a Wye Branch, items 9 and 10 are pipe spools and items 11 and 12 are blind flanges. In some embodiments in which multiple interlocking containers are located on top of each other and placed into an interlocked configuration, only the lowermost interlocking container may include a conveyance system (e.g., conveyance system 600 of FIGS. 28-29).

Figure 30:
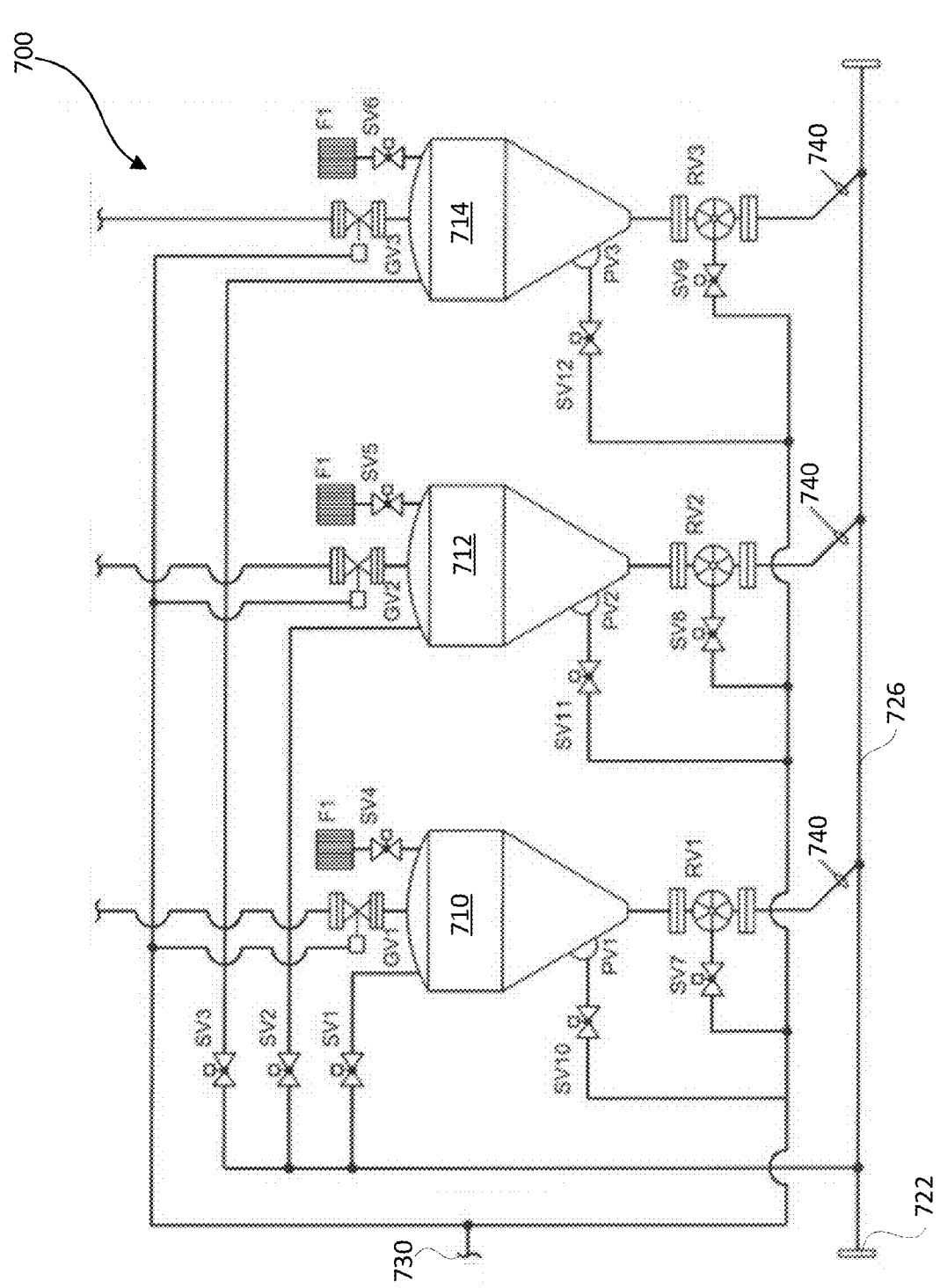
FIG. 30 illustrates components of a conveyor box or conveyor unit, according to embodiments of the present invention.

In some embodiments, one or more interlocking containers (e.g., interlocking container 100) are placed on top of or next to a conveyor box or container unit. For example, FIG. 30 depicts components of a conveyor box 700 that is placed below an interlocking container 100. The conveyor box 700, in some embodiments, includes a frame formed of various frame members and corner castings. The frame may be formed of steel, iron, or similar materials, or may also be formed of lighter materials, such as aluminum. In some embodiments, the footprint of the conveyor box 700 is substantially identical, the same, or similar to the footprint of the interlocking containers located above it. Within the frame are storage chambers or blow tanks 710, 712, 714 that receive materials from the storage chambers of the interlocking container. In some embodiments, the conveyor box and the interlocking container are first placed into an interlocked position before materials are passed from the interlocking container to the conveyor box through the activation of gate valves (e.g., GV1-GV3). In some embodiments, activating the gate valves GV1-GV3 involves activating solenoid valves incorporated into those gate valves. Interlocking the interlocking container and the conveyor box may use the techniques discussed above for sealing the outlets of the interlocking containers to the inlets of the conveyor box.

The conveyor box 700 includes multiple transportation mechanisms for extracting and/or transporting materials. For example, in some embodiments a single conveyor box 700 includes components for the mechanical transfer of materials (e.g., conveyor belts) and components for pneumatic transfers of materials under pressure (e.g., compressors and/or blowers) as well as components for applying a vacuum to the storage chambers to facilitate the transfer of materials. In various embodiments, the conveyor box includes one, two, three, or more transportation mechanisms. As a result, the conveyor box can be used to remove a wide variety of materials stored in various interlocking containers.

For example, as shown in, e.g., FIG. 30, conveyor box 700 includes a series of valves and switches that enable the manual and/or electrical engagement of different transport mechanisms. For example, an air container (e.g., a blower) may introduce positive air pressure (e.g., 15 PSI or 100 PSI) through a first air input line 722. A series of valves (e.g., solenoid valves SV1-SV3) are used to selectively determine where that positive pressure is applied. For example, the positive pressure may be introduced into a top portion of storage containers 710, 712, 714, such that the materials in the storage containers 710, 712, 714 are blown out of the storage containers 710, 712, 714. The positive pressure may also be used to help push materials through a conveyance line 726. The conveyance line 726 may be a four inch pipe, a six inch pipe or a pipe of a similar diameter. The positive pressure may also be used to drive a Venturi system, e.g., on an interlocking container, as discussed above.

Positive pressure may also be used to pneumatically operate various mechanisms within the conveyor box 700. For example, compressed air may be introduced into a second air input line 730. When valves SV7-SV9 are opened, the compressed air passes through those valves and drives corresponding Rotary Valves RV1-RV3. The Rotary Valves RV1-RV3 pull materials (e.g., sand) from the storage containers 710, 712, 714 into conveyance lines 740. The materials then pass into the conveyance line 726. Similarly, when valves SV10-SV12 are electrically opened, the compressed air passes through those valves and drives corresponding Pneumatic Vibrators PV1-PV3, which help material fall through the storage containers 710, 712, 714 toward their respective Rotary Valves RV1-RV3. In some embodiments, pinch valves are used instead of Rotary Valves RV1-RV3.

In addition, in some embodiments, negative air pressure may be applied to either or both of the lines 722, 730 and selectively applied using the valves SV1-SV9. For example, negative pressure may be introduced into the storage containers 710, 712, 714 (e.g., through the gate valves GV1-GV3) in order to remove air pockets in the storage containers. The negative pressure may also be applied to the Rotary Valves (e.g., RV1-RV3) so that materials in the storage containers 710, 712, 714 are pulled from the storage containers 710, 712, 714. These applications of negative pressure may be used in conjunction with the Venturi system discussed above. Each of the storage containers 710, 712, 714 may also include filters (F1) accessed through valves (SV4-SV6). Opening the valves (SV4-SV6) enables outside air to pass through the filter and relieve negative or positive pressures in the storage containers 710, 712, 714. Depending on whether positive or negative pressure is applied through the line 722 and/or 730, air may pass in either direction through the filters F1.

As mentioned above, the conveyor box 700 also includes Rotary Valves (e.g., RV1-RV3) that enable the manual unloading of materials from the storage containers 710, 712, 714, using, e.g., screws. The manual transport mechanism may also use racks on a skid for manually feeding materials to a conveyor. The outlets of the Rotary Valves RV1-RV3 connect to the conveyance line 726 through the additional pipes 740 located within the conveyor box 700.

To operatively couple the interlocking unit to the conveyor box, specific pipes and wires on the interlocking unit are coupled to corresponding parts on the conveyor box. The particular pipes and/or wires may differ depending on the particular transfer mechanism to be employed. Exemplary pipes and wires include air lines for high pressure utility air, electrical lines for control power, and air lines for blower transfer air.

In some embodiments, using a combination of transfer mechanisms, extraction rates could reach 32,240 pounds an hour. In some embodiments, each interlocking container holds approximately 32,000 pounds, such that an entire container may be emptied in about an hour.

In other embodiments, the interlocking container includes an adaptor plate that facilitates the entry of materials into the storage compartments. For example, in some embodiments the diameter of the opening into each storage compartment is 18 inches. However, other transporting containers, such as rail cars, use pneumatic conveyance systems with six inch hoses. The adaptor plate is configured to provide the adaptive coupling between the hoses and the openings to ensure secure and air-tight transfer.

Figure 31:
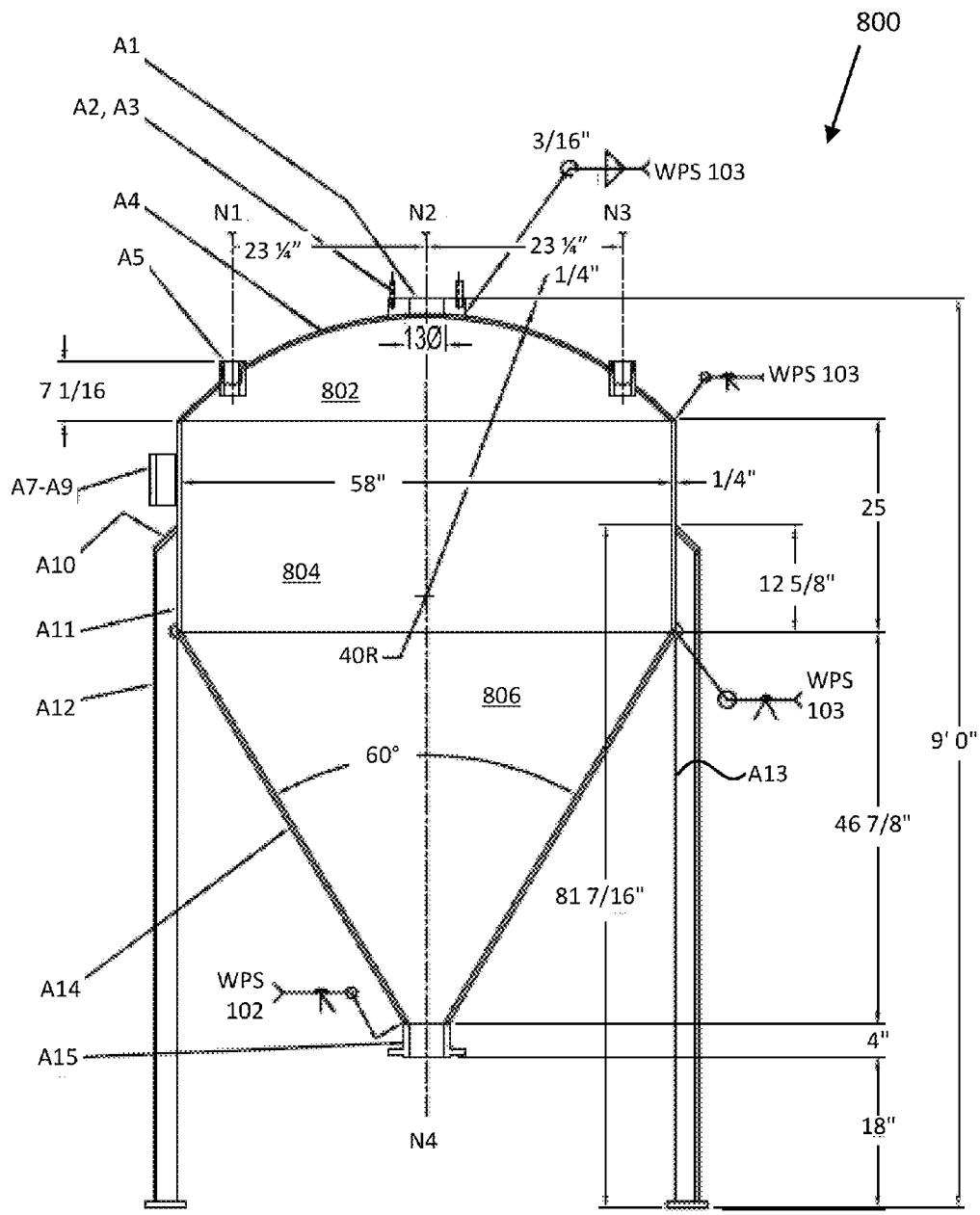
FIG. 31 is a side elevation view of a storage container or blower tank, according to embodiments of the present invention.

Referring now to FIG. 31, a storage container 800 (e.g., storage container 710 in FIG. 30) includes an upper portion 802, a middle portion 804 and a lower portion 806. The upper portion 802 includes apertures N1 and N3 that may be used to apply air pressure (e.g., a vacuum or positive pressure) within the container 800. The upper portion 802 further includes an inlet N2 with a special perimeter for engaging a sealing boot (e.g., sealing boot 140). The middle portion 804 in FIG. 31 is cylindrical and the lower portion 806 is cone-shaped ending in an outlet N4. In FIG. 31, item A1 is a studding outlet, item A2 is a tap stud, item A3 is a hex nut, item A4 is a dished head, item A5 is a half coupling, item A7 is a structural channel, item A8 is a nameplate, item A9 is a drive screw, item A10 is a plate, item A11 is another plate, item A12 is a support leg, item A13 is another support leg, item A14 is a cone, and item A15 is flange. Also shown in FIG. 31 are markings that refer to portions of the Welding Procedure Specification (WPS) that may be employed according to some embodiments.

Figure 32:
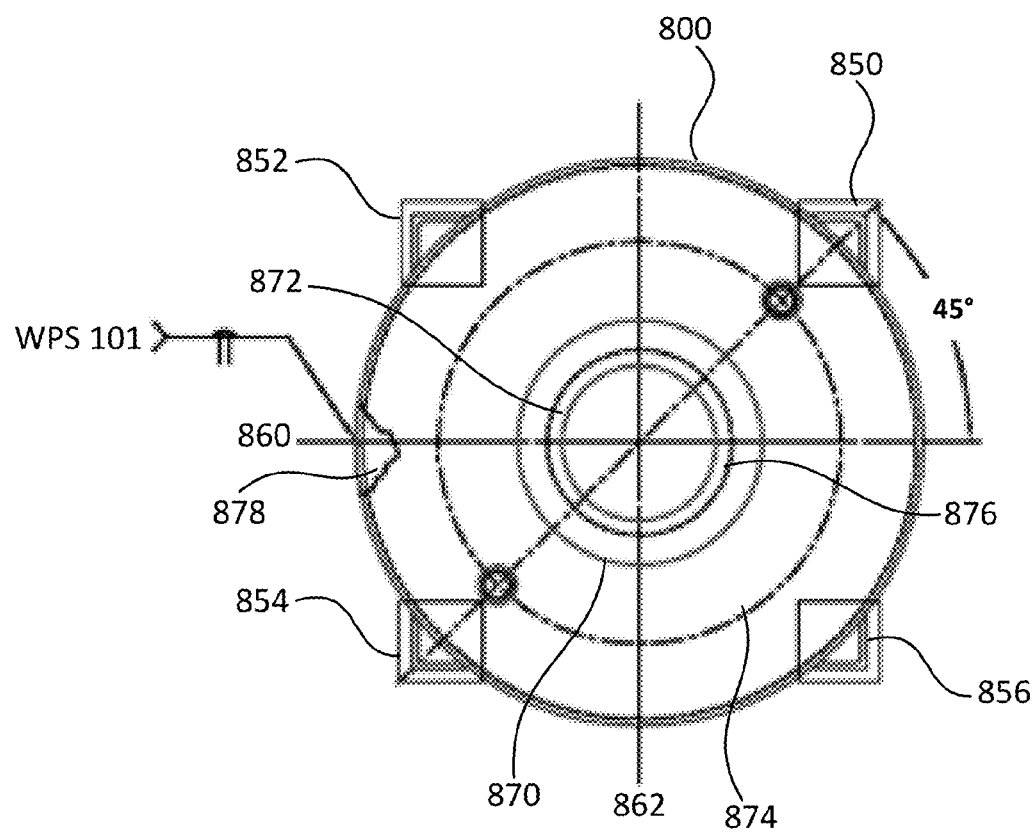
FIG. 32 is a top plan view of a storage container according to embodiments of the present invention.
Figure 33:
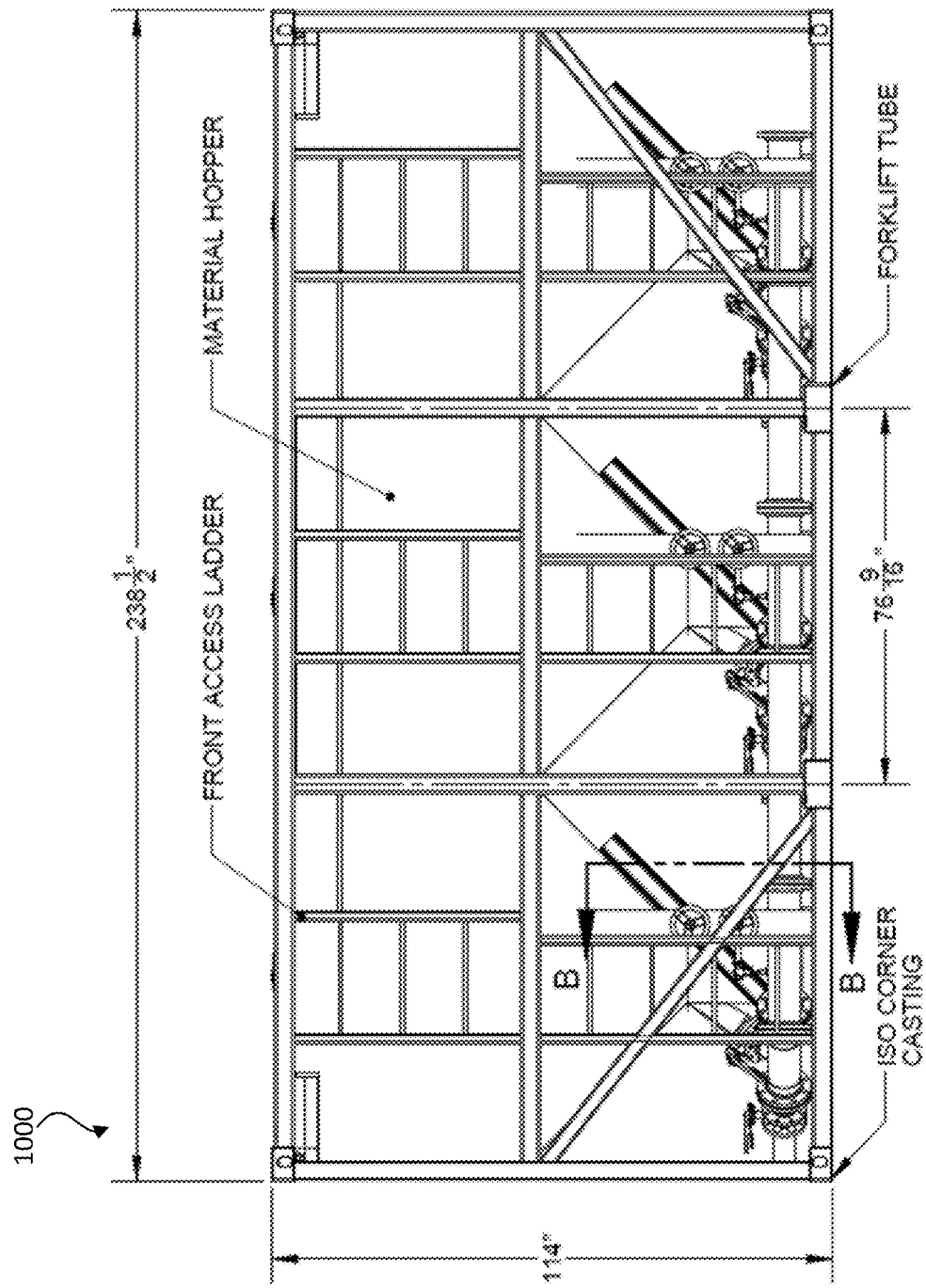
FIG. 33 is a side elevation view of another interlocking container, according to embodiments of the present invention.
Figure 34:
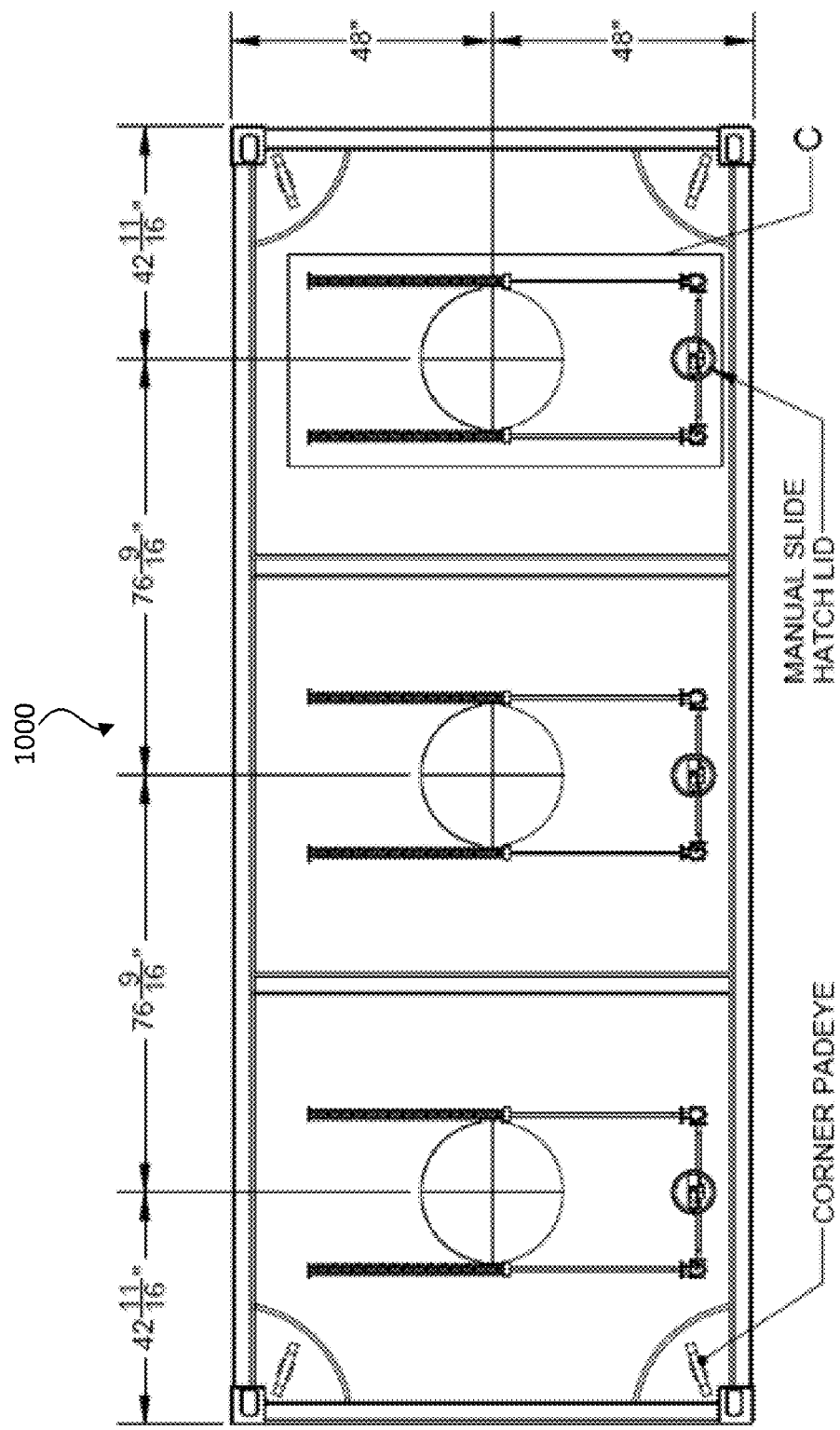
FIG. 34 is a top plan view of the interlocking container of FIG. 33 in which the hopper caps are in the closed position.

As shown in FIG. 32, which is a top view of a storage container like that shown in FIG. 31, the storage container 800 includes four legs 850, 852, 854, and 856 equally spaced around the perimeter of the outlet. These legs correspond to items A12 and A13 in FIG. 31. These legs 850, 852, 854, and 856 are placed 45 degrees from centerlines 860 and 862. FIG. 32 also shows an inner perimeter 870 of the inlet N2 as well as the outer perimeter 872 of the inlet N2. FIG. 32 also includes various reference lines, including line 874 identifying a reference diameter centerline for nozzle layout dimensioning, line 876 identifying a reference diameter centerline for items A2 and A3 in FIG. 31, and line 878 identifying a break-out line to depict weld details of the storage container 800.

Figure 35:
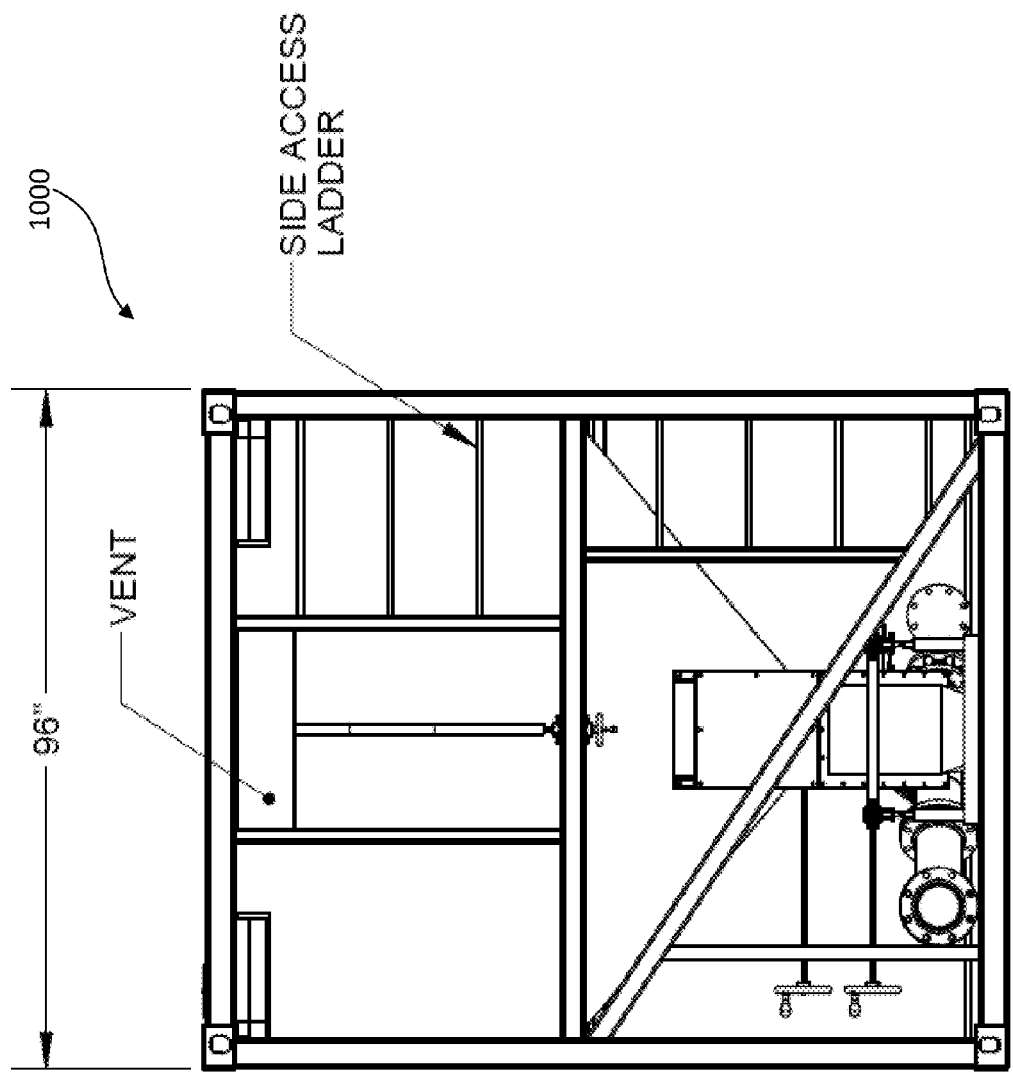
FIG. 35 is a front elevation view of the interlocking container of FIG. 33.
Figure 36:
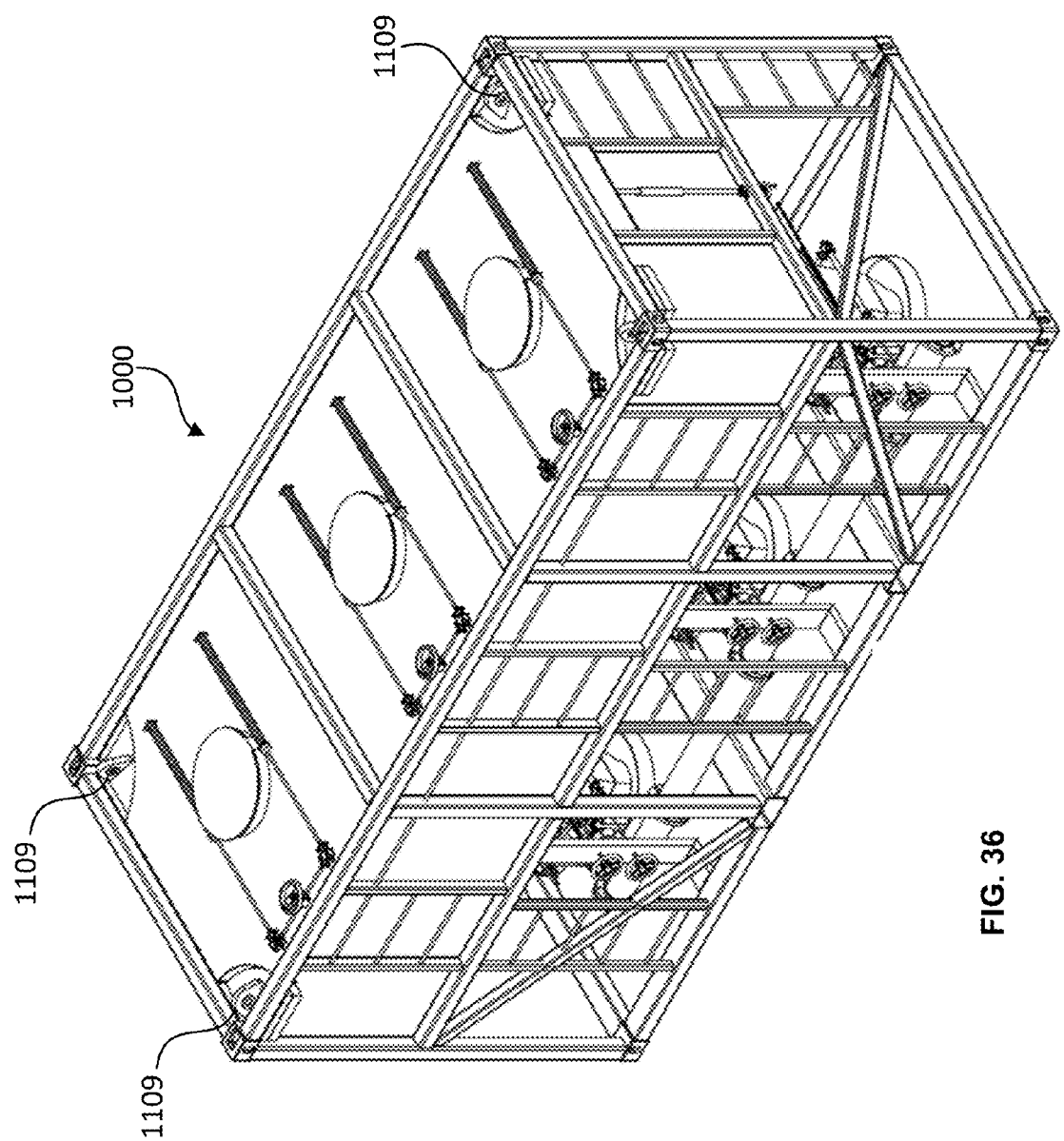
FIG. 36 is a perspective view of the interlocking container of FIG. 33.
Figure 37:
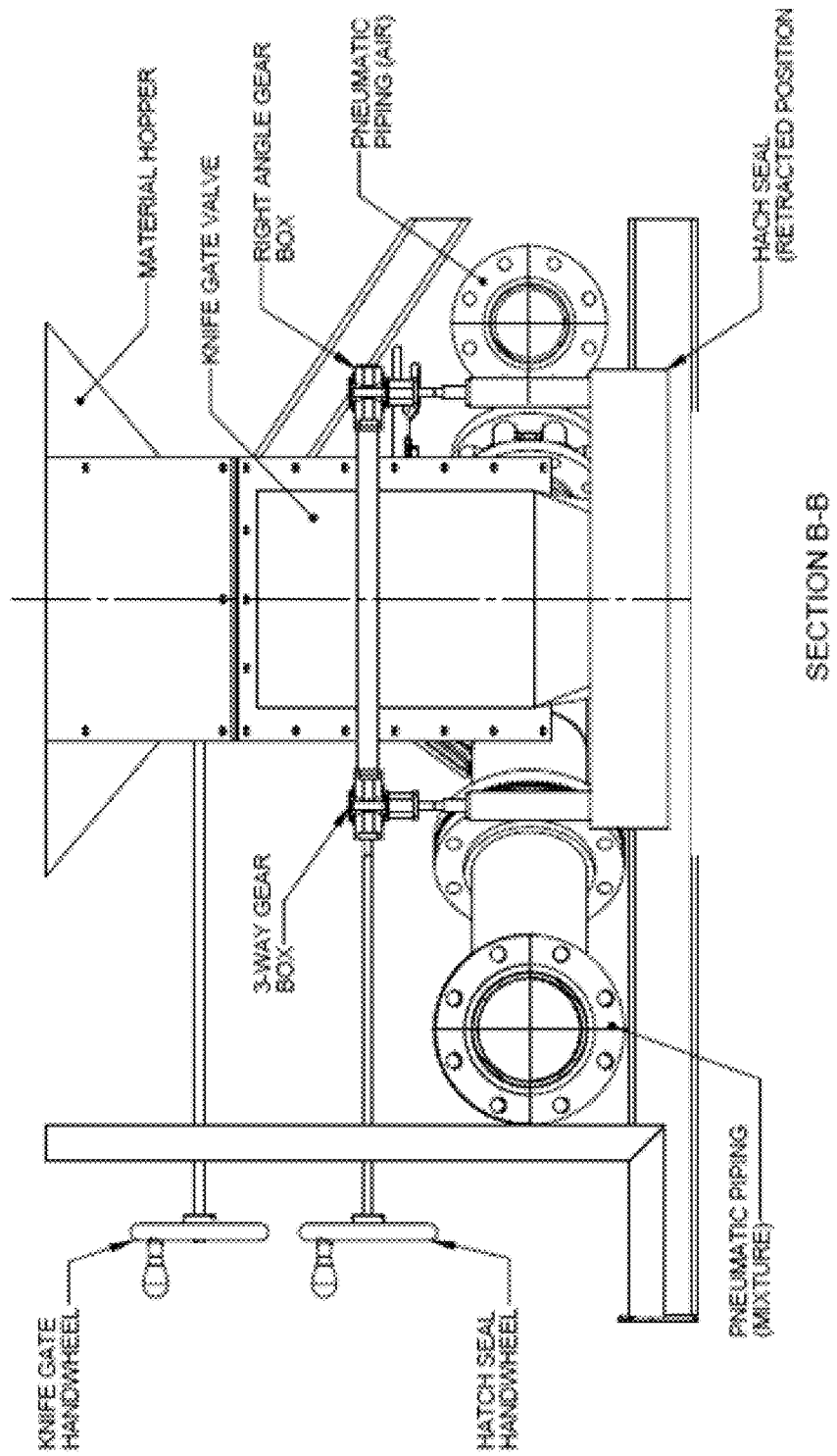
FIG. 37 is a cut-away view of the interlocking container of FIG. 33 along the lines "B-B" in FIG. 33.
Figure 38:
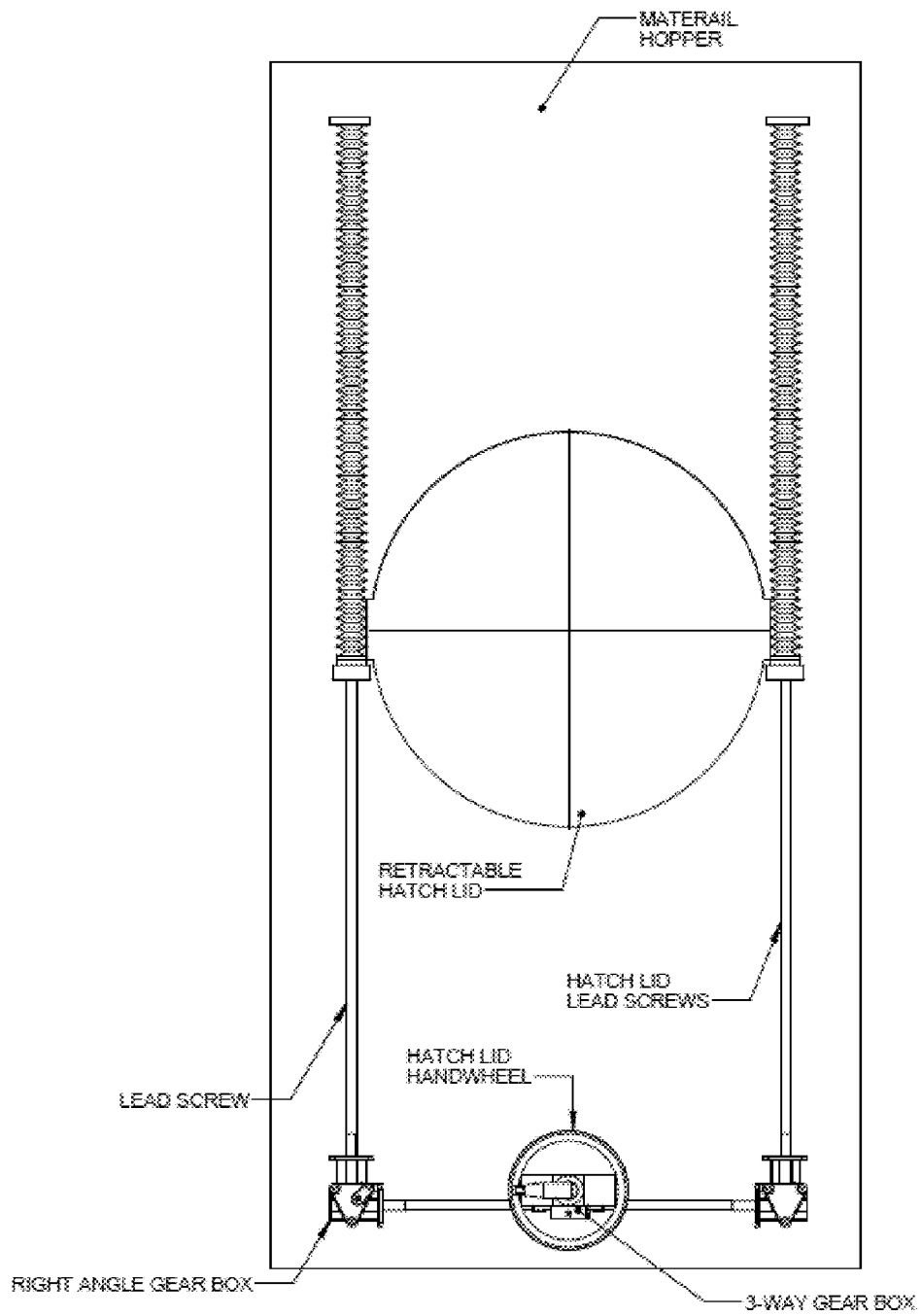
FIG. 38 is top view of the interlocking container of FIG. 33 as identified by the box "C" in FIG. 34.
Figure 39:
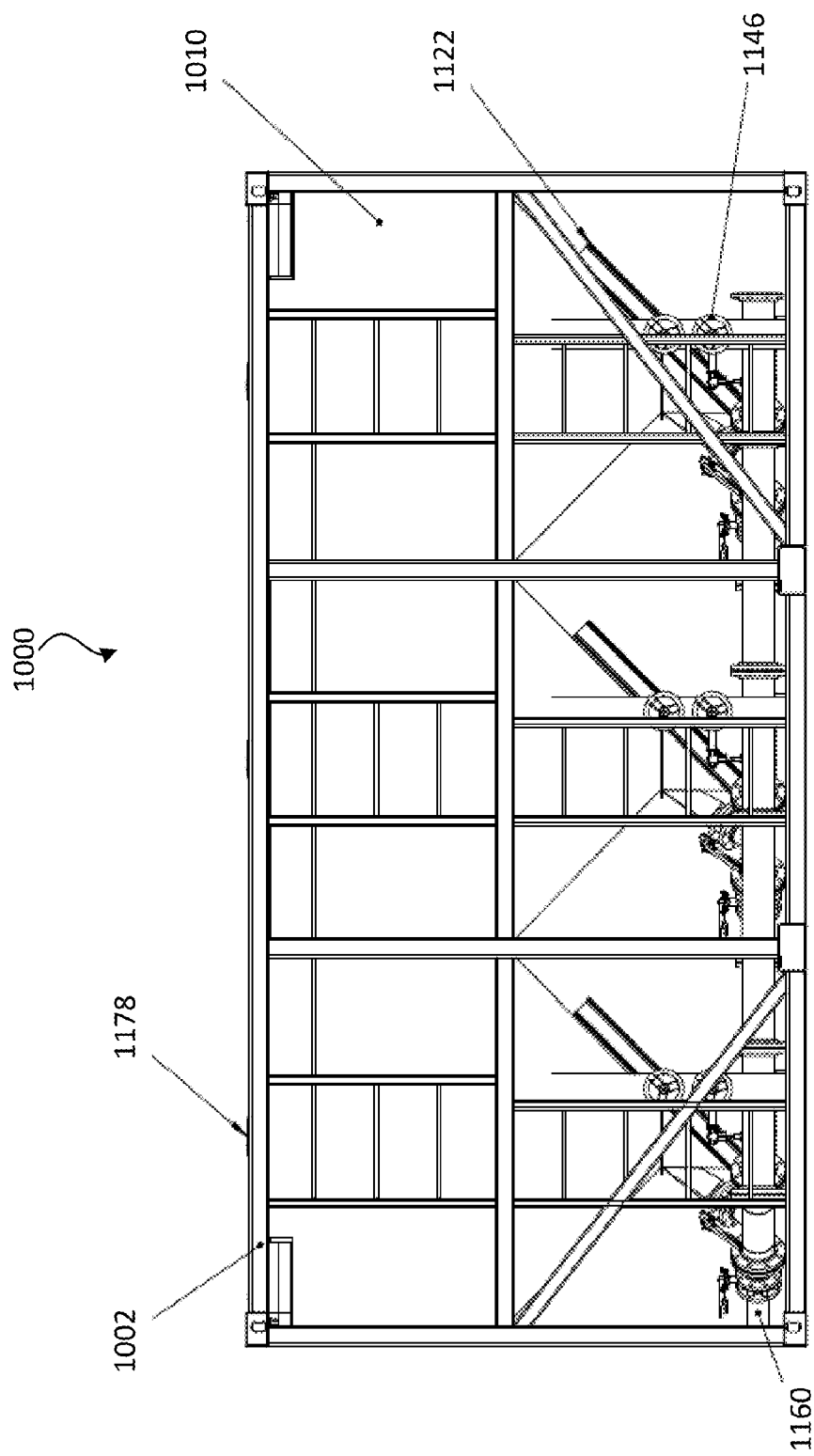
FIG. 39 is another side elevation view of the interlocking container of FIG. 33.
Figure 40:
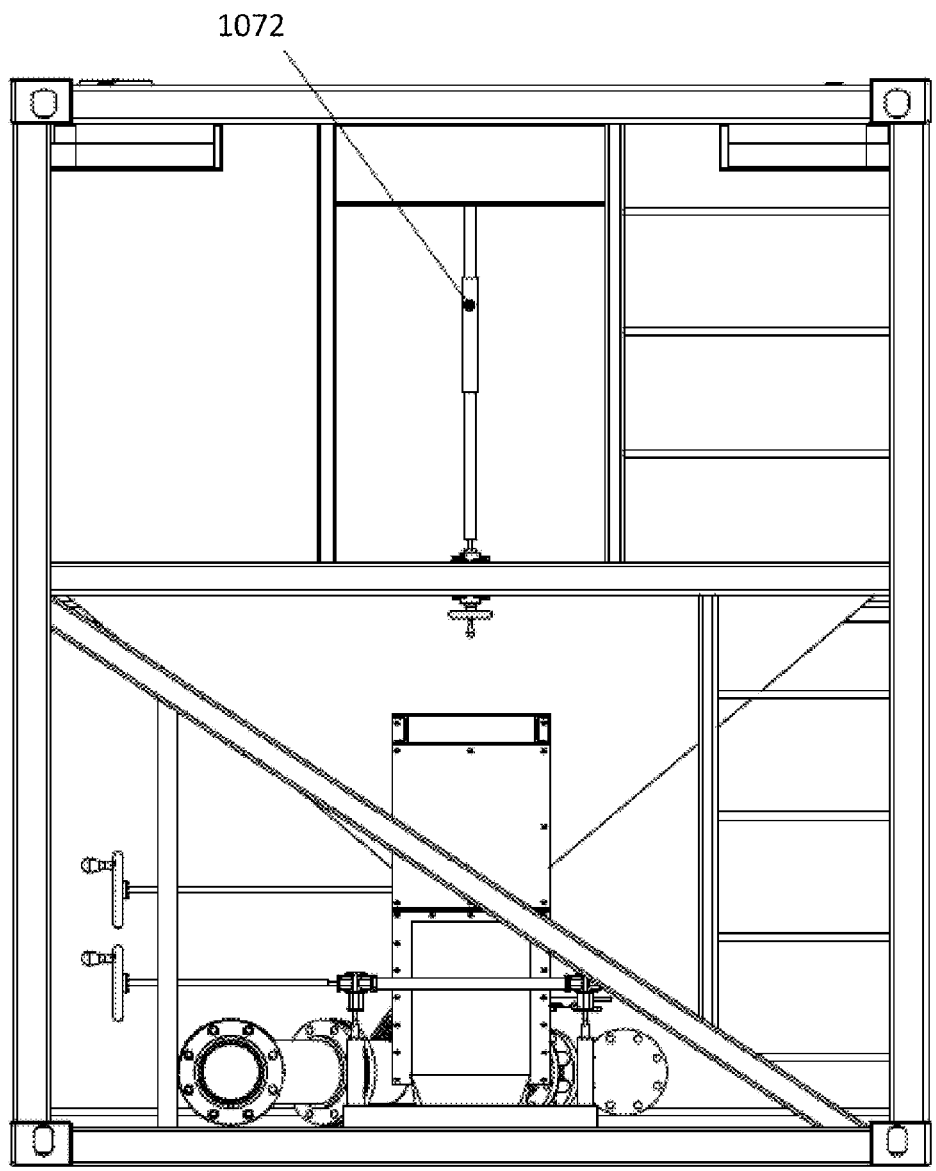
FIG. 40 is another front elevation view of the interlocking container of FIG. 33.
Figure 41:
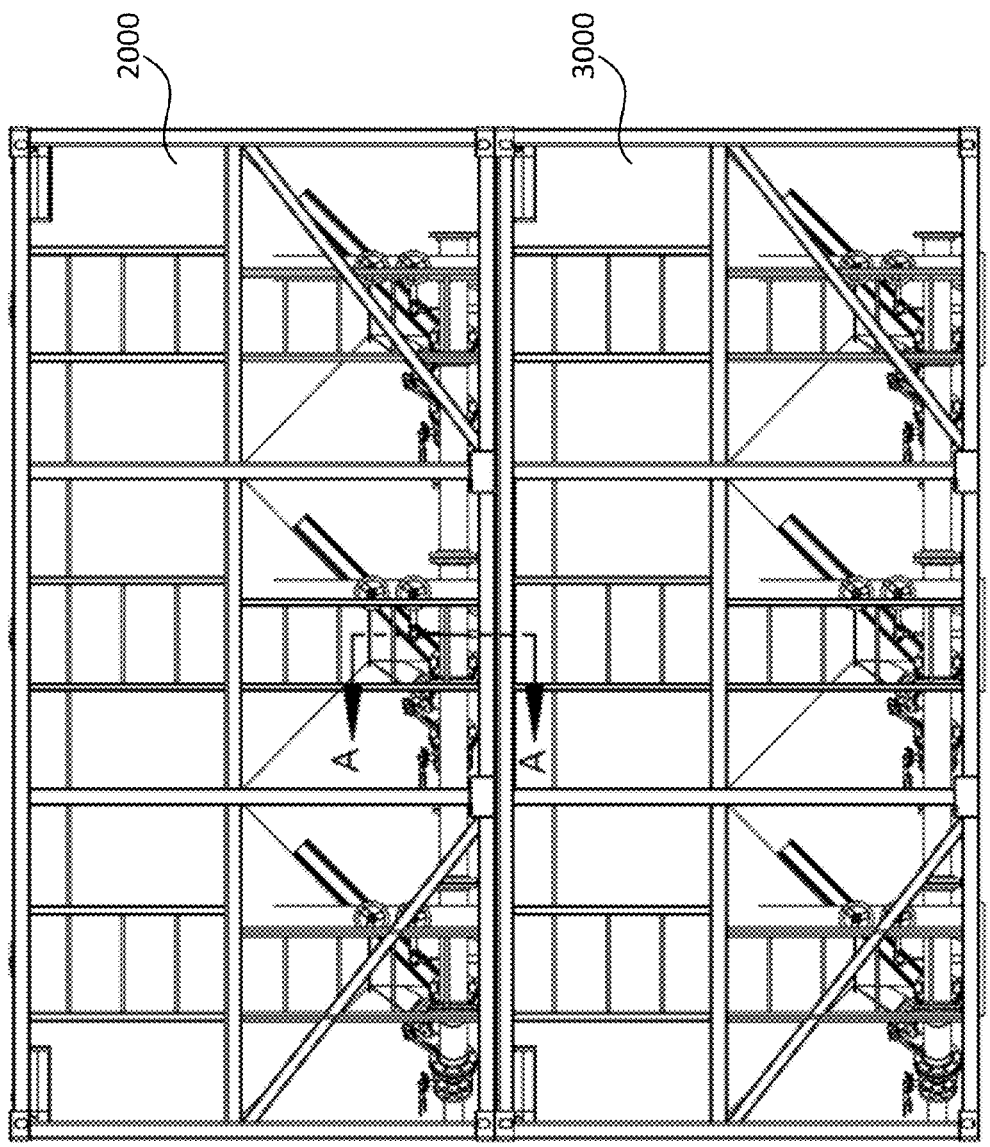
FIG. 41 is a side elevation view of two interlocking containers in an interlocked configuration, according to embodiments of the present invention.
Figure 42:
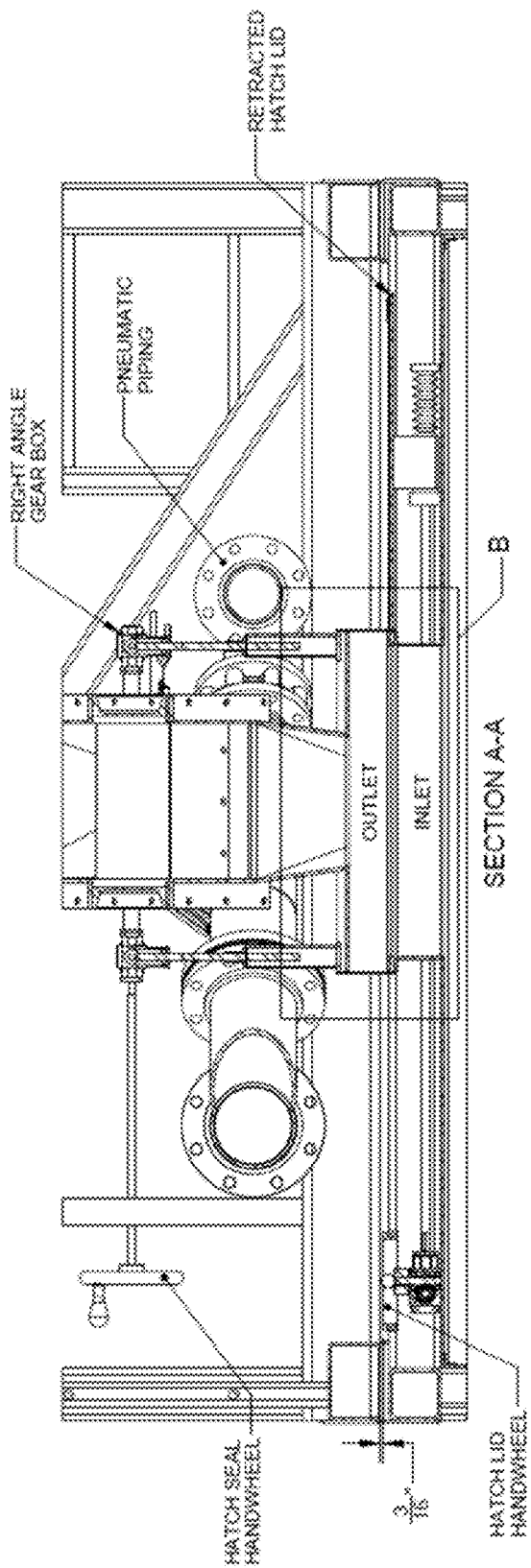
FIG. 42 is a cut-away view of the two interlocking containers of FIG. 41 along the lines "A-A" in FIG. 41.
Figure 43:
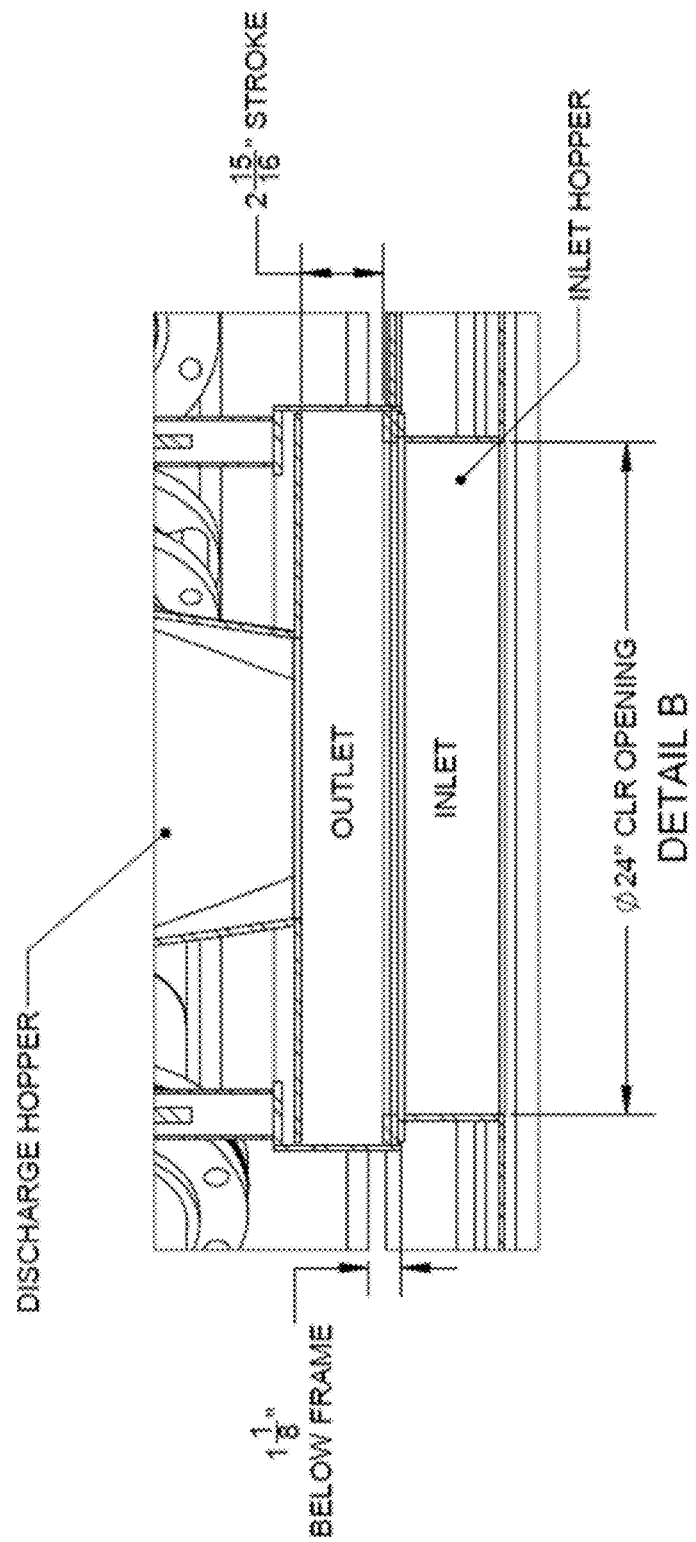
FIG. 43 is a view of components of the two interlocking containers identified by the box "B" in FIG. 42.
Figure 44:
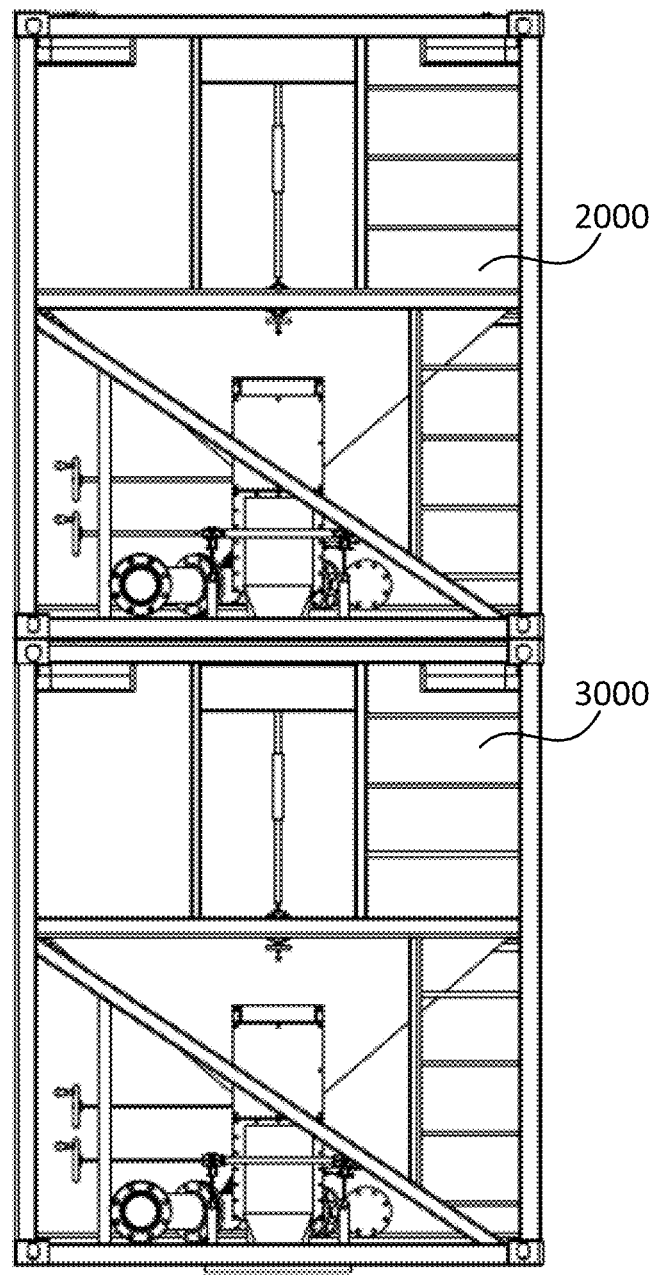
FIG. 44 is a front elevation view of the two interlocking containers of FIG. 41.
Figure 45:
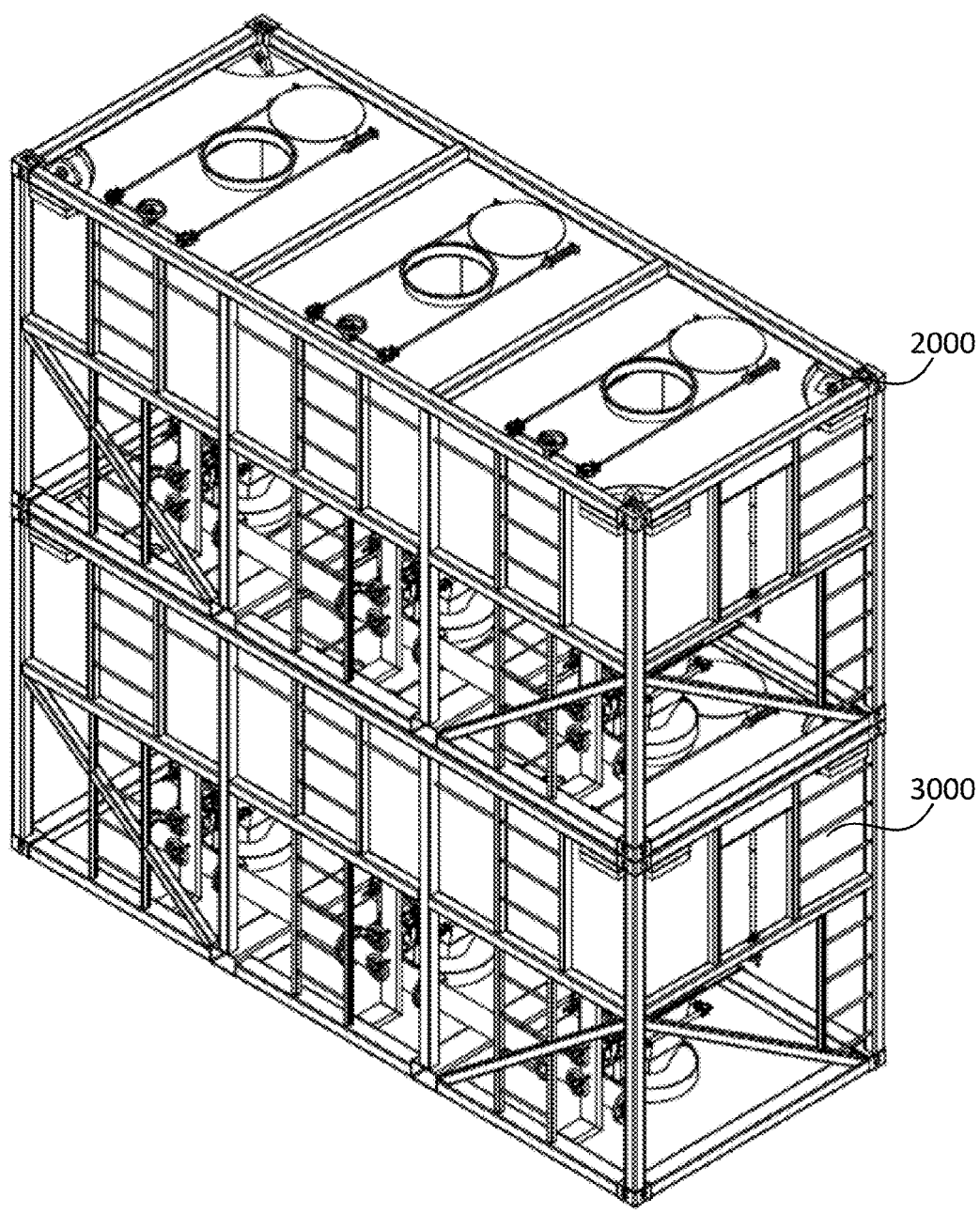
FIG. 45 is an upper perspective view of the interlocking containers of FIG. 41.

Referring now to FIGS. 33-40, an interlocking container 1000 includes many of the features discussed above (e.g., with respect to FIGS. 1-15). Likewise, FIGS. 41-45 illustrate two interlocking containers 2000 and 3000 that include many of the features discussed above (e.g., with respect to FIGS. 16-17 and 23-27). In addition, as shown in FIGS. 35 and 40, the interlocking container 1000 includes a vent that may be opened using, e.g., a retractable arm 1072. As shown in FIG. 39, the interlocking container 1000 includes a frame 1002, a storage chamber 1110, a gate valve 1122, pressure system 1160, a hopper cap 1178, and a sealing boot wheel 1146, according to some embodiments.

Still referring to FIGS. 33-40, the interlocking container includes pad eyes (e.g., 1109 in FIG. 36) at the corners that adhere to the Det Norske Veritas (DNV) 2.7-3 standard for portable offshore units. As shown in FIG. 38, the interlocking container incorporates a custom design 3-way gear box and a retractable hand wheel, which remain below the upper plane (e.g., 106 in FIG. 9).

In some embodiments, the frame (e.g., 102 in FIG. 1) has been sized to adhere to dimensions of a shipping container per the American Bureau of Shipping (ABS) Rules for Certification of Cargo Containers (19'-10.5"×8'-0"×9'-6") and to maximize space at outside of the corner castings (e.g., 105 in FIG. 1). In addition, in some embodiments the ladders have been revised to eliminate the additional stop plates so the rungs stop at the frame member (e.g., 104 in FIG. 1).

As discussed above, a container may facilitate multiple delivery systems (pneumatic, manual/gravity feed to conveyer, and Venturi). These delivery systems may be used to transport a variety of products, including any and all aggregates and agricultural products. For example, the container may be designed for transporting and distributing frac sand, such as barite at 200 mesh. Other containers may be designed for a more lightweight system with lighter weight and more affordable valves, including multiple valve systems employing Venturi-based material transport mechanisms.

Figure 47:
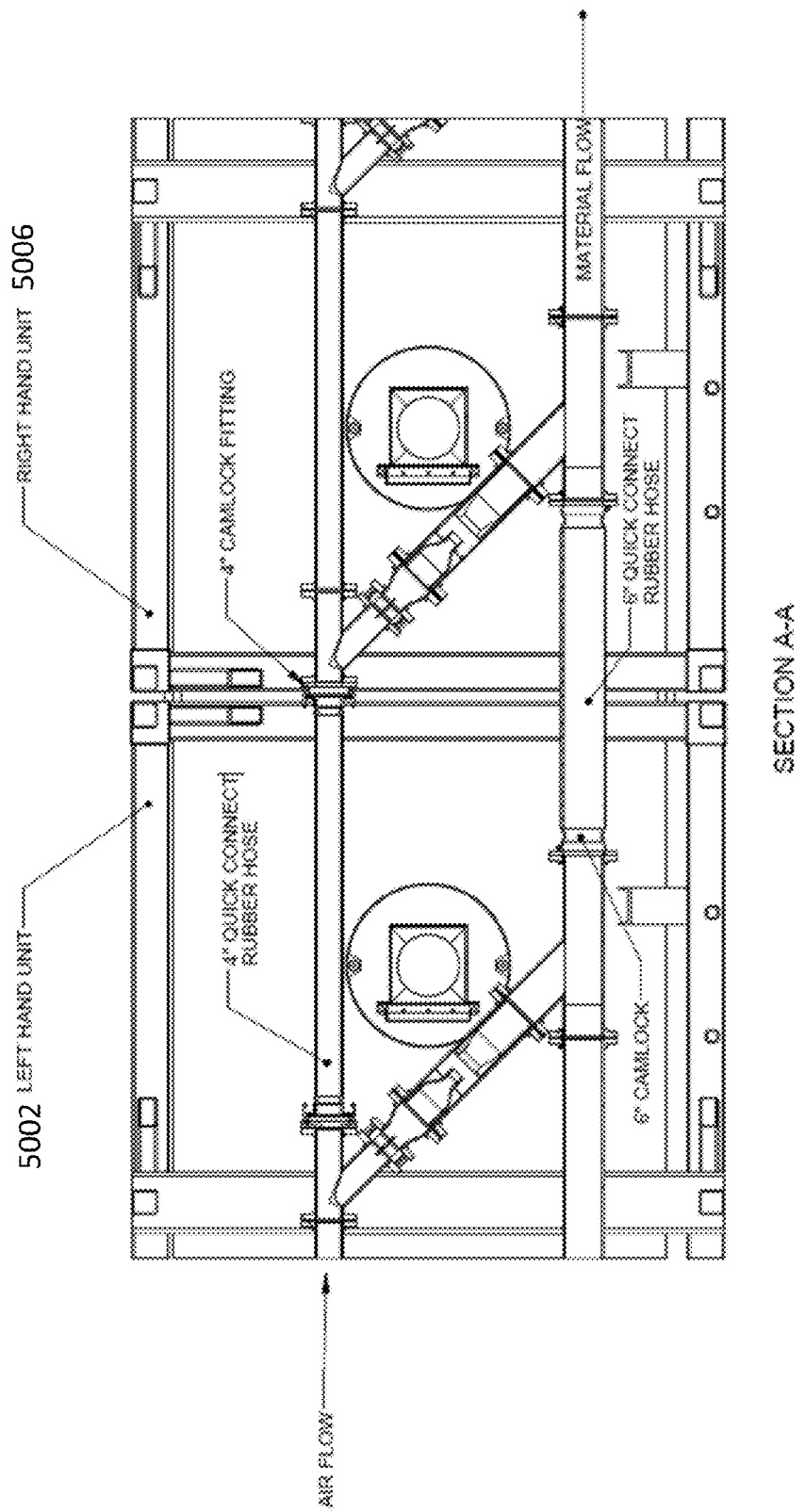
FIG. 47 is a bottom view of the two horizontally adjacent interlocking containers of FIG. 48 along the lines "A-A" in FIG. 46.

As shown in FIGS. 46-48, four containers 5000, 5002, 5004, 5006 may be loaded on to a flatbed rail car. In these figures, the two bottom containers 5002 and 5006 have a conveyance/delivery system. The two bottom containers 5002, 5006 connect with a horizontal interlock with quick disconnect hoses, piping, and fittings. The two top containers 5000, 5004 may be vertically connected with their respective bottom containers 5002, 5006 in an interlocking manner as discussed above. In some embodiments, these four containers are designed for the oil field, e.g., to be placed on a portable skid system designed to displace the weight and cargo of the four containers.

The interlocking containers (e.g., interlocking container 1000) provides several distinct advantages according to various embodiments. For example, these containers provide improved ventilation, facilitate access to the adjustable levers from a ladder system, and/or enable access to the storage chambers and levers from the perimeter of the container. As a result, the operator will not need to be on top or crawl in between the containers. They are also designed to load and off load at the same timeframe and capacity as a pneumatic truck or rail car, according to some embodiments.

In some embodiments, multiple interlocking containers are coupled together using a pneumatic system in combination with the interlocking features discussed above. As a result, these interlocking containers will be operational from the ground with 100% pneumatics, eliminating the need for the ladder system to access the upper containers.

According to some embodiments, the interlocking container (e.g., interlocking container 1000) is designed to connect and adapt to a variety and a multitude of existing universal products, e.g., blower handlers, compressors, generators, hoses, tubes, valves, and the like. The interlocking container may be further equipped with quick connect and disconnect fasteners, designed to adapt universally and fit existing products that are industry specific, e.g., farming, mining, petroleum, cement/aggregate, and the like.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An interlocking container for intermodal transportation, the container comprising:
   a frame defining a top plane and a bottom plane;

a storage chamber located within the frame, the storage chamber having an inlet located below the top plane of the frame and an outlet located above the bottom plane of the frame; and a sealing member operatively coupled to the outlet of the storage chamber, the sealing member being configured to transition between a retracted position in which the sealing member is located above the bottom plane of the frame and an extended position in which the sealing member extends below the bottom plane of the frame, the sealing member being further configured to create a sealed connection with an inlet of a storage chamber of another interlocking container when in the extended position.

2. The interlocking container of claim 1, further comprising a cap configured to transition between a closed configuration in which the cap seals the inlet of the storage chamber and an open configuration in which the cap does not seal the inlet of the storage chamber.

3. The interlocking container of claim 2; further comprising a mechanism coupled to the cap and operative to transition the cap between the closed configuration and the open configuration.

4. The interlocking container of claim 3, wherein the mechanism comprises:
a drive gear box; and
a screw driven by the drive gear box.

5. The interlocking container of claim 4, wherein the drive gear box and the screw are located below the top plane of the frame.

6. The interlocking container of claim 1, wherein the storage chamber is a first storage chamber and wherein the interlocking container further comprises a second storage chamber, and a third storage chamber.

7. The interlocking container of claim 6, wherein the inlet is a first inlet and the outlet is a first outlet, wherein the second storage chamber has a second inlet located below the top plane of the frame and a second outlet located above the bottom plane of the frame; and wherein the third storage chamber has a third inlet located below the top plane of the frame and a third outlet located above the bottom plane of the frame.

8. The interlocking container of claim 1, wherein the frame is adapted to couple with an interlocking container placed on top of the frame and with an interlocking container placed below the frame.

9. The interlocking container of claim 1, wherein the sealed connection substantially prevents external materials from entering the inlet of the container and enables internal materials to pass from the outlet of the storage chamber through the inlet of the storage chamber of the other interlocking container.

10. The interlocking container of claim 1, further comprising a manually-operated mechanism configured to transition the sealing member between the retracted position and the extended position.

11. The interlocking container of claim 1, wherein the interlocking container has a footprint substantially defined by the frame, and wherein the frame is configured to support multiple interlocking containers stacked on top of the frame without substantially increasing the footprint.

12. The interlocking container of claim 1, further comprising a conveyor unit configured to transport materials from the storage chamber.

13. The interlocking container of claim 12, wherein the conveyor unit includes multiple transportation mechanisms for transporting the materials from the storage chamber.

14. The interlocking container of claim 13, wherein the multiple transportation mechanisms include a Venturi system, a blower system, and a manual system.

15. The interlocking container of claim 13, wherein the conveyor unit includes a series of valves that enables selective application of a particular transportation mechanism of the multiple transportation mechanisms.

16. The interlocking container of claim 12, wherein the conveyor unit is located below the bottom plane.

17. The interlocking container of claim 1, further comprising a gate configured to selectively open and close the outlet.

18. The interlocking container of claim 17, further comprising a drive mechanism coupled to the gate and operative to cause the gate to selectively open and close the outlet.

* * * * *